(12) United States Patent
Ma et al.

(10) Patent No.: US 11,889,487 B2
(45) Date of Patent: Jan. 30, 2024

(54) REDUCED SUBCARRIER SPACING WINDOW

(71) Applicant: QUALCOMM Incorporated, San Diego, CA (US)

(72) Inventors: Jun Ma, San Diego, CA (US); Tao Luo, San Diego, CA (US); Qiang Wu, San Diego, CA (US); Iyab Issam Sakhnini, San Diego, CA (US); Mehmet Izzet Gurelli, San Diego, CA (US); Ahmed Abdelaziz Ibrahim Abdelaziz Zewail, San Diego, CA (US); Xiaoxia Zhang, San Diego, CA (US); Jing Sun, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/316,576

(22) Filed: May 10, 2021

(65) Prior Publication Data

US 2021/0360629 A1    Nov. 18, 2021

Related U.S. Application Data

(60) Provisional application No. 63/024,223, filed on May 13, 2020.

(51) Int. Cl.
*H04L 12/28* (2006.01)
*H04W 72/0453* (2023.01)
*H04J 1/16* (2006.01)

(52) U.S. Cl.
CPC .............................. *H04W 72/0453* (2013.01)

(58) Field of Classification Search
CPC ........ H04L 27/26025; H04W 72/0446; H04W 72/0453; H04W 72/044
(Continued)

(56) References Cited

U.S. PATENT DOCUMENTS 11,284,247 B2 *   3/2022   Ouchi ..................... H04L 27/26
11,337,220 B2 *   5/2022   Liu ........................ H04W 16/28
(Continued)

OTHER PUBLICATIONS

International Search Report and Written Opinion—PCT/US2021/031767—ISA/EPO—dated Aug. 25, 2021.

*Primary Examiner* — John Pezzlo
(74) *Attorney, Agent, or Firm* — Holland & Hart LLP/QUALCOMM Incorporated

(57) ABSTRACT

Methods, systems, and devices for wireless communications are described. For example, a user equipment (UE) may transmit, to a base station, an indication of a capability of the UE to switch from monitoring a set of frequency resources according to a first subcarrier spacing (SCS) to monitoring the set of frequency resources according to a second SCS, less than the first SCS. The indication may indicate an amount of time for the UE to switch between SCSs. The UE may receive, from the base station, signaling that indicates a configuration for monitoring the set of frequency resources according to the second SCS (e.g., a configuration for a reduced SCS window). The UE may switch from monitoring the set of frequency resources according to the first SCS to monitoring the set of frequency resources according to the second SCS based on receiving the configuration for monitoring the set of frequency resources.

40 Claims, 24 Drawing Sheets

(58) Field of Classification Search
USPC .................................. 370/252, 329, 430, 442
See application file for complete search history.

(56) References Cited

U.S. PATENT DOCUMENTS

| | | | |
|---|---|---|---|
| 11,528,741 B2* | 12/2022 | Yeo | ........................ H04W 72/23 |
| 2018/0092080 A1* | 3/2018 | Kim | ........................ H04L 5/0053 |
| 2018/0110019 A1 | 4/2018 | Ly et al. | |
| 2018/0279289 A1 | 9/2018 | Islam et al. | |
| 2020/0084753 A1* | 3/2020 | Li | ........................ H04W 72/048 |
| 2020/0100219 A1* | 3/2020 | Takeda | .................... H04L 1/189 |

* cited by examiner

REDUCED SUBCARRIER SPACING WINDOW

CROSS REFERENCE

The present application for patent claims the benefit of U.S. Provisional Patent Application No. 63/024,223 by Ma et al., entitled "REDUCED SUBCARRIER SPACING WINDOW," filed May 13, 2020, which is assigned to the assignee hereof, and is expressly incorporated by reference herein.

INTRODUCTION

The following relates to wireless communications and more specifically to managing subcarrier spacing (SCS) windows.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include transmitting, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The method may additionally include receiving, from the base station in response to transmitting the indication of the capability of the UE, signaling that indicates a configuration for monitoring the set of frequency resources according to the second SCS, and switching from monitoring the set of frequency resources according to the first SCS to monitoring the set of frequency resources according to the second SCS based on the received configuration for monitoring the set of frequency resources.

An apparatus for wireless communication at a UE is described. The apparatus may include a processor and memory coupled to the processor, the processor and memory configured to transmit, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. In some cases, the processor and memory may additionally be configured to receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

Another apparatus for wireless communication at a UE is described. The apparatus may include means for transmitting, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The apparatus may additionally include a means for receiving, from the base station in response to transmitting the indication of the capability of the UE, signaling that indicates a configuration for monitoring the set of frequency resources according to the second SCS, and means for switching from monitoring the set of frequency resources according to the first SCS to monitoring the set of frequency resources according to the second SCS based on the received configuration for monitoring the set of frequency resources.

A non-transitory computer-readable medium storing code for wireless communication at a UE is described. The code may include instructions executable by a processor to transmit, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The code may also include instructions executable by a processor to receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

Some examples of the method, apparatuses, and non-transitory computer-readable medium described herein may further include operations, features, means, or instructions for refraining, based on the received configuration for monitoring the set of frequency resources, from the switching until receiving a signal that indicates a switch from monitoring the set of frequency resources according to the first SCS to monitoring the set of frequency resources according to the second SCS and receiving, from the base station, the signal that indicates the switch, where the switching may be based on receiving the signal that indicates the switch.

Some examples of the method, apparatuses, and non-transitory computer-readable medium described herein may further include operations, features, means, or instructions for receiving downlink control information from the base station, where receiving the signal that indicates the switch may be based on receiving the downlink control information.

Some examples of the method, apparatuses, and non-transitory computer-readable medium described herein may further include operations, features, means, or instructions for receiving a media access control (MAC) control element (CE) from the base station, where receiving the signal that indicates the switch may be based on receiving the MAC-CE.

Some examples of the method, apparatuses, and non-transitory computer-readable medium described herein may further include operations, features, means, or instructions for determining, based on the received configuration for monitoring the set of frequency resources, to autonomously switch from monitoring the set of frequency resources according to the first SCS to monitoring the set of frequency resources according to the second SCS, where the switching may be based on determining to autonomously switch.

Some examples of the method, apparatuses, and non-transitory computer-readable medium described herein may further include operations, features, means, or instructions for monitoring, based on the switching, the set of frequency resources according to the second SCS for a duration of time indicated by the received configuration for monitoring the set of frequency resources and switching, after the duration of time, from monitoring the set of frequency resources according to the second SCS to monitoring the set of frequency resources according to the first SCS based on the received configuration for monitoring the set of frequency resources.

In some examples of the method, apparatuses, and non-transitory computer-readable medium described herein, the duration of time spans one synchronization signal block (SSB) transmission opportunity within a burst of SSB transmission opportunities.

In some examples of the method, apparatuses, and non-transitory computer-readable medium described herein, the duration of time spans a subset of SSB transmission opportunities within a burst of SSB transmission opportunities.

In some examples of the method, apparatuses, and non-transitory computer-readable medium described herein, the duration of time includes each SSB transmission opportunity within a burst of SSB transmission opportunities.

In some examples of the method, apparatuses, and non-transitory computer-readable medium described herein, the signaling that indicates the configuration for monitoring the set of frequency resources according to the second SCS includes a bitmap and each bit of the bitmap indicates whether the UE may be to monitor the set of frequency resources during a time period associated with an SSB transmission within a burst of SSB transmissions.

Some examples of the method, apparatuses, and non-transitory computer-readable medium described herein may further include operations, features, means, or instructions for receiving a radio resource control (RRC) message from the base station, where receiving the signaling that indicates the configuration for monitoring the set of frequency resources may be based on receiving the RRC message.

Some examples of the method, apparatuses, and non-transitory computer-readable medium described herein may further include operations, features, means, or instructions for receiving system information from the base station, where receiving the signaling that indicates the configuration for monitoring the set of frequency resources may be based on receiving the system information.

In some examples of the method, apparatuses, and non-transitory computer-readable medium described herein, monitoring the set of frequency resources according to the first SCS may include operations, features, means, or instructions for monitoring the set of frequency resources according to the first SCS for a physical downlink control channel (PDCCH) transmission, a physical downlink shared channel (PDSCH) transmission, or a combination thereof.

A method for wireless communication at a base station is described. The method may include transmitting one or more first downlink transmissions to a UE via a set of frequency resources according to a first SCS, receiving, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The method may additionally include transmitting, to the UE in response to receiving the indication of the capability of the UE, signaling that indicates a configuration for monitoring the set of frequency resources according to the second SCS based on the capability of the UE to switch from the first SCS to the second SCS, and transmitting, to the UE, one or more second downlink transmissions via the set of frequency resources according to the second SCS based on transmitting the signaling that indicates the configuration.

An apparatus for wireless communication at a base station is described. The apparatus may include a processor and memory coupled to the processor, the processor and memory configured to transmit one or more first downlink transmissions to a UE via a set of frequency resources according to a first SCS, receive, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The processor and memory may additionally be configured to transmit, to the UE in response to receiving the indication of the capability of the UE, signaling that indicates a configuration for monitoring the set of frequency resources according to the second SCS based on the capability of the UE to switch from the first SCS to the second SCS, and transmit, to the UE, one or more second downlink transmissions via the set of frequency resources according to the second SCS based on transmitting the signaling that indicates the configuration.

Another apparatus for wireless communication at a base station is described. The apparatus may include means for transmitting one or more first downlink transmissions to a UE via a set of frequency resources according to a first SCS, means for receiving, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The apparatus may additionally include a means for transmitting, to the UE in response to receiving the indication of the capability of the UE, signaling that indicates a configuration for monitoring the set of frequency resources according to the second SCS based on the capability of the UE to switch from the first SCS to the second SCS, and means for transmitting, to the UE, one or more second downlink transmissions via the set of frequency resources according to the second SCS based on transmitting the signaling that indicates the configuration.

A non-transitory computer-readable medium storing code for wireless communication at a base station is described. The code may include instructions executable by a processor to transmit one or more first downlink transmissions to a UE via a set of frequency resources according to a first SCS, receive, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The code may additionally include instructions executable by a processor to transmit, to the UE in response to receiving the indication of the capability of the UE, signaling that indicates a configuration for monitoring the set of frequency resources according to the second SCS based on the capability of the UE to switch from the first SCS to the second SCS, and transmit, to the UE, one or more second downlink transmissions via the set of frequency resources according to the second SCS based on transmitting the signaling that indicates the configuration.

Some examples of the method, apparatuses, and non-transitory computer-readable medium described herein may further include operations, features, means, or instructions for indicating, to the UE based on transmitting the signaling that indicates the configuration, to refrain from the switching from the first SCS to the second SCS until receiving a signal that indicates a switch from the first SCS to the second SCS and transmitting, to the UE, the signal that indicates the switch, where transmitting the one or more second downlink transmissions to the UE may be based on transmitting the signal that indicates the switch.

Some examples of the method, apparatuses, and non-transitory computer-readable medium described herein may further include operations, features, means, or instructions for transmitting downlink control information (DCI) to the UE, where transmitting the signal that indicates the switch may be based on transmitting the DCI.

Some examples of the method, apparatuses, and non-transitory computer-readable medium described herein may further include operations, features, means, or instructions for transmitting a MAC-CE to the UE, where transmitting the signal that indicates the switch may be based on transmitting the MAC-CE.

Some examples of the method, apparatuses, and non-transitory computer-readable medium described herein may further include operations, features, means, or instructions for indicating, to the UE based on transmitting the signaling that indicates the configuration, to autonomously switch from the first SCS to the second SCS, where transmitting the one or more second downlink transmissions to the UE may be based on indicating to autonomously switch.

In some examples of the method, apparatuses, and non-transitory computer-readable medium described herein, the configuration indicates a duration of time for the UE to monitor the set of frequency resources according to the second SCS.

In some examples of the method, apparatuses, and non-transitory computer-readable medium described herein, the duration of time spans one SSB transmission opportunity within a burst of SSB transmission opportunities.

In some examples of the method, apparatuses, and non-transitory computer-readable medium described herein, the duration of time spans a subset of SSB transmission opportunities within a burst of SSB transmission opportunities.

In some examples of the method, apparatuses, and non-transitory computer-readable medium described herein, the duration of time includes each SSB transmission opportunity within a burst of SSB transmission opportunities.

In some examples of the method, apparatuses, and non-transitory computer-readable medium described herein, the signaling that indicates the configuration for monitoring the set of frequency resources according to the second SCS includes a bitmap and each bit of the bitmap indicates whether the UE may be to monitor the set of frequency resources during a time period associated with an SSB transmission within a burst of SSB transmissions.

Some examples of the method, apparatuses, and non-transitory computer-readable medium described herein may further include operations, features, means, or instructions for transmitting an RRC message to the UE, where transmitting the signaling that indicates the configuration for monitoring the set of frequency resources may be based on transmitting the RRC message.

Some examples of the method, apparatuses, and non-transitory computer-readable medium described herein may further include operations, features, means, or instructions for transmitting system information to the UE, where transmitting the signaling that indicates the configuration for monitoring the set of frequency resources may be based on transmitting the system information.

In some examples of the method, apparatuses, and non-transitory computer-readable medium described herein, the one or more second downlink transmissions include one or more SSBs.

In some examples of the method, apparatuses, and non-transitory computer-readable medium described herein, the one or more first downlink transmissions include a PDCCH transmission, a PDSCH transmission, or a combination thereof.

A method for wireless communication is described. The method may include monitoring a set of frequency resources according to a first SCS, and transmitting, to a base station, an indication of a capability of a UE to switch from the first SCS to a second SCS that is less than the first SCS. The method may further include receiving, from the base station in response to transmitting the indication of the capability of the UE, signaling that indicates a configuration for monitoring the set of frequency resources according to the second SCS, and switching from monitoring the set of frequency resources according to the first SCS to monitoring the set of frequency resources according to the second SCS based on the received configuration for monitoring the set of frequency resources.

An apparatus for wireless communication at a UE is described. The apparatus may include a processor and memory coupled to the processor. The processor and memory may be configured to monitor a set of frequency resources according to a first SCS, and transmit, to a base station, an indication of a capability of the UE to switch from the first SCS to a second SCS that is less than the first SCS. The processor and memory may further be configured to receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

Another apparatus for wireless communication at a UE is described. The apparatus may include means for monitoring a set of frequency resources according to a first SCS, and means for transmitting, to a base station, an indication of a capability of the UE to switch from the first SCS to a second SCS that is less than the first SCS. The apparatus may further include means for receiving, from the base station in response to transmitting the indication of the capability of the UE, signaling that indicates a configuration for monitoring the set of frequency resources according to the second SCS, and switching from monitoring the set of frequency resources according to the first SCS to monitoring the set of frequency resources according to the second SCS based on the received configuration for monitoring the set of frequency resources.

A non-transitory computer-readable medium storing code for wireless communication at a UE is described. The code may include instructions executable by a processor to monitor a set of frequency resources according to a first SCS, and transmit, to a base station, an indication of a capability of the UE to switch from the first SCS to a second SCS that is less than the first SCS. The code may further include instructions executable by the processor to receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

Some examples of the method, apparatuses, and non-transitory computer-readable medium described herein may further include operations, features, means, or instructions for determining, based on the received configuration for monitoring the set of frequency resources, to refrain from the switching until receiving a signal that indicates a switch from monitoring the set of frequency resources according to the first SCS to monitoring the set of frequency resources according to the second SCS. The examples of the method, apparatuses, and non-transitory computer-readable medium described herein may further include operations, features, means, or instructions for receiving, from the base station, the signal that indicates the switch, where the switching may be based on receiving the signal that indicates the switch.

Some cases of the method, apparatuses, and non-transitory computer-readable medium described herein may further include operations, features, means, or instructions for receiving DCI from the base station, where receiving the signal that indicates the switch may be based on receiving the DCI.

Some instances of the method, apparatuses, and non-transitory computer-readable medium described herein may further include operations, features, means, or instructions for receiving a MAC-CE from the base station, where receiving the signal that indicates the switch may be based on receiving the MAC-CE.

Some examples of the method, apparatuses, and non-transitory computer-readable medium described herein may further include operations, features, means, or instructions for determining, based on the received configuration for monitoring the set of frequency resources, to autonomously switch from monitoring the set of frequency resources according to the first SCS to monitoring the set of frequency resources according to the second SCS. In some cases, the switching may be based on determining to autonomously switch.

Some cases of the method, apparatuses, and non-transitory computer-readable medium described herein may further include operations, features, means, or instructions for monitoring, based on the switching, the set of frequency resources according to the second SCS for a duration of time indicated by the received configuration for monitoring the set of frequency resources. The method, apparatuses, and non-transitory computer-readable medium described herein may further include operations, features, means, or instructions for switching, after the duration of time, from monitoring the set of frequency resources according to the second SCS to monitoring the set of frequency resources according to the first SCS based on the received configuration for monitoring the set of frequency resources.

In some instances of the method, apparatuses, and non-transitory computer-readable medium described herein, the duration of time spans one SSB transmission opportunity within a burst of SSB transmission opportunities.

In some examples of the method, apparatuses, and non-transitory computer-readable medium described herein, the duration of time spans a subset of SSB transmission opportunities within a burst of SSB transmission opportunities.

In some cases of the method, apparatuses, and non-transitory computer-readable medium described herein, the duration of time includes each SSB transmission opportunity within a burst of SSB transmission opportunities.

In some instances of the method, apparatuses, and non-transitory computer-readable medium described herein, the signaling that indicates the configuration for monitoring the set of frequency resources according to the second SCS includes a bitmap. Here, each bit of the bitmap may indicate whether the UE may be to monitor the set of frequency resources during a time period associated with an SSB transmission within a burst of SSB transmissions.

Some examples of the method, apparatuses, and non-transitory computer-readable medium described herein may further include operations, features, means, or instructions for receiving an RRC message from the base station, where receiving the signaling that indicates the configuration for monitoring the set of frequency resources may be based on receiving the RRC message.

Some cases of the method, apparatuses, and non-transitory computer-readable medium described herein may further include operations, features, means, or instructions for receiving system information from the base station, where receiving the signaling that indicates the configuration for monitoring the set of frequency resources may be based on receiving the system information.

In some instances of the method, apparatuses, and non-transitory computer-readable medium described herein, the indication of the capability of the UE to switch from the first SCS to the second SCS indicates an amount of time for the UE to switch from the first SCS to the second SCS.

In some examples of the method, apparatuses, and non-transitory computer-readable medium described herein, monitoring the set of frequency resources according to the first SCS further may include operations, features, means, or instructions for monitoring the set of frequency resources according to the first SCS for a PDCCH transmission, a PDSCH transmission, or a combination thereof.

A method of wireless communication at a base station is described. The method may include transmitting one or more first downlink transmissions to a UE via a set of frequency resources according to a first SCS, receiving, from the UE, an indication of a capability of the UE to switch from the first SCS to a second SCS that is less than the first SCS, and determining a configuration for the UE to monitor the set of frequency resources according to the second SCS based on the capability of the UE to switch from the first SCS to the second SCS. The method may further include transmitting, to the UE in response to receiving the indication of the capability of the UE, signaling that indicates the configuration for monitoring the set of frequency resources according to the second SCS, and transmitting, to the UE, one or more second downlink transmissions via the set of frequency resources according to the second SCS based on transmitting the signaling that indicates the configuration.

An apparatus for wireless communication at a base station is described. The apparatus may include a processor and memory coupled to the processor. The memory and processor may be configured to transmit one or more first downlink transmissions to a UE via a set of frequency resources according to a first SCS, receive, from the UE, an indication of a capability of the UE to switch from the first SCS to a second SCS that is less than the first SCS, and determine a configuration for the UE to monitor the set of frequency resources according to the second SCS based on the capability of the UE to switch from the first SCS to the second SCS. In some cases, the memory and processor may be further configured to transmit, to the UE in response to receiving the indication of the capability of the UE, signaling that indicates the configuration for monitoring the set of frequency resources according to the second SCS, and transmit, to the UE, one or more second downlink transmissions via the set of frequency resources according to the second SCS based on transmitting the signaling that indicates the configuration.

Another apparatus for wireless communication at a base station is described. The apparatus may include means for transmitting one or more first downlink transmissions to a UE via a set of frequency resources according to a first SCS, receiving, from the UE, an indication of a capability of the UE to switch from the first SCS to a second SCS that is less than the first SCS, and determining a configuration for the UE to monitor the set of frequency resources according to the second SCS based on the capability of the UE to switch from the first SCS to the second SCS. The apparatus may further include means for transmitting, to the UE in response to receiving the indication of the capability of the UE, signaling that indicates the configuration for monitoring the set of frequency resources according to the second SCS, and transmitting, to the UE, one or more second downlink transmissions via the set of frequency resources according to the second SCS based on transmitting the signaling that indicates the configuration.

A non-transitory computer-readable medium storing code for wireless communication at a base station is described. The code may include instructions executable by a processor to transmit one or more first downlink transmissions to a UE via a set of frequency resources according to a first SCS, receive, from the UE, an indication of a capability of the UE to switch from the first SCS to a second SCS that is less than the first SCS, and determine a configuration for the UE to monitor the set of frequency resources according to the second SCS based on the capability of the UE to switch from the first SCS to the second SCS. The code may further include instructions executable by a processor to transmit, to the UE in response to receiving the indication of the capability of the UE, signaling that indicates the configuration for monitoring the set of frequency resources according to the second SCS, and transmit, to the UE, one or more second downlink transmissions via the set of frequency resources according to the second SCS based on transmitting the signaling that indicates the configuration.

Some examples of the method, apparatuses, and non-transitory computer-readable medium described herein may further include operations, features, means, or instructions for indicating, to the UE based on transmitting the signaling that indicates the configuration, to refrain from the switching from the first SCS to the second SCS until receiving a signal that indicates a switch from the first SCS to the second SCS. Additionally, the method, apparatuses, and non-transitory computer-readable medium described herein may further include operations, features, means, or instructions for transmitting, to the UE, the signal that indicates the switch, where transmitting the one or more second downlink transmissions to the UE may be based on transmitting the signal that indicates the switch.

Some cases of the method, apparatuses, and non-transitory computer-readable medium described herein may further include operations, features, means, or instructions for transmitting DCI to the UE, where transmitting the signal that indicates the switch may be based on transmitting the DCI.

Some instances of the method, apparatuses, and non-transitory computer-readable medium described herein may further include operations, features, means, or instructions for transmitting a MAC-CE to the UE, where transmitting the signal that indicates the switch may be based on transmitting the MAC-CE.

Some examples of the method, apparatuses, and non-transitory computer-readable medium described herein may further include operations, features, means, or instructions for indicating, to the UE based on transmitting the signaling that indicates the configuration, to autonomously switch from the first SCS to the second SCS. In some cases, transmitting the one or more second downlink transmissions to the UE may be based on indicating to autonomously switch.

In some cases of the method, apparatuses, and non-transitory computer-readable medium described herein, the configuration indicates a duration of time for the UE to monitor the set of frequency resources according to the second SCS.

In some instances of the method, apparatuses, and non-transitory computer-readable medium described herein, the duration of time spans one SSB transmission opportunity within a burst of SSB transmission opportunities.

In some examples of the method, apparatuses, and non-transitory computer-readable medium described herein, the duration of time spans a subset of SSB transmission opportunities within a burst of SSB transmission opportunities.

In some cases of the method, apparatuses, and non-transitory computer-readable medium described herein, the duration of time includes each SSB transmission opportunity within a burst of SSB transmission opportunities.

In some instances of the method, apparatuses, and non-transitory computer-readable medium described herein, the signaling that indicates the configuration for monitoring the set of frequency resources according to the second SCS includes a bitmap, and each bit of the bitmap indicates whether the UE may be to monitor the set of frequency resources during a time period associated with an SSB transmission within a burst of SSB transmissions.

Some examples of the method, apparatuses, and non-transitory computer-readable medium described herein may further include operations, features, means, or instructions for transmitting an RRC message to the UE, where transmitting the signaling that indicates the configuration for monitoring the set of frequency resources may be based on transmitting the RRC message.

Some cases of the method, apparatuses, and non-transitory computer-readable medium described herein may further include operations, features, means, or instructions for transmitting system information to the UE, where transmitting the signaling that indicates the configuration for monitoring the set of frequency resources may be based on transmitting the system information.

In some instances of the method, apparatuses, and non-transitory computer-readable medium described herein, the indication of the capability of the UE to switch from the first SCS to the second SCS indicates an amount of time for the UE to switch from the first SCS to the second SCS.

In some examples of the method, apparatuses, and non-transitory computer-readable medium described herein, the one or more second downlink transmissions include one or more SSBs.

In some cases of the method, apparatuses, and non-transitory computer-readable medium described herein, the one or more first downlink transmissions include a PDCCH transmission, a PDSCH transmission, or a combination thereof.

DETAILED DESCRIPTION

Figure 1:
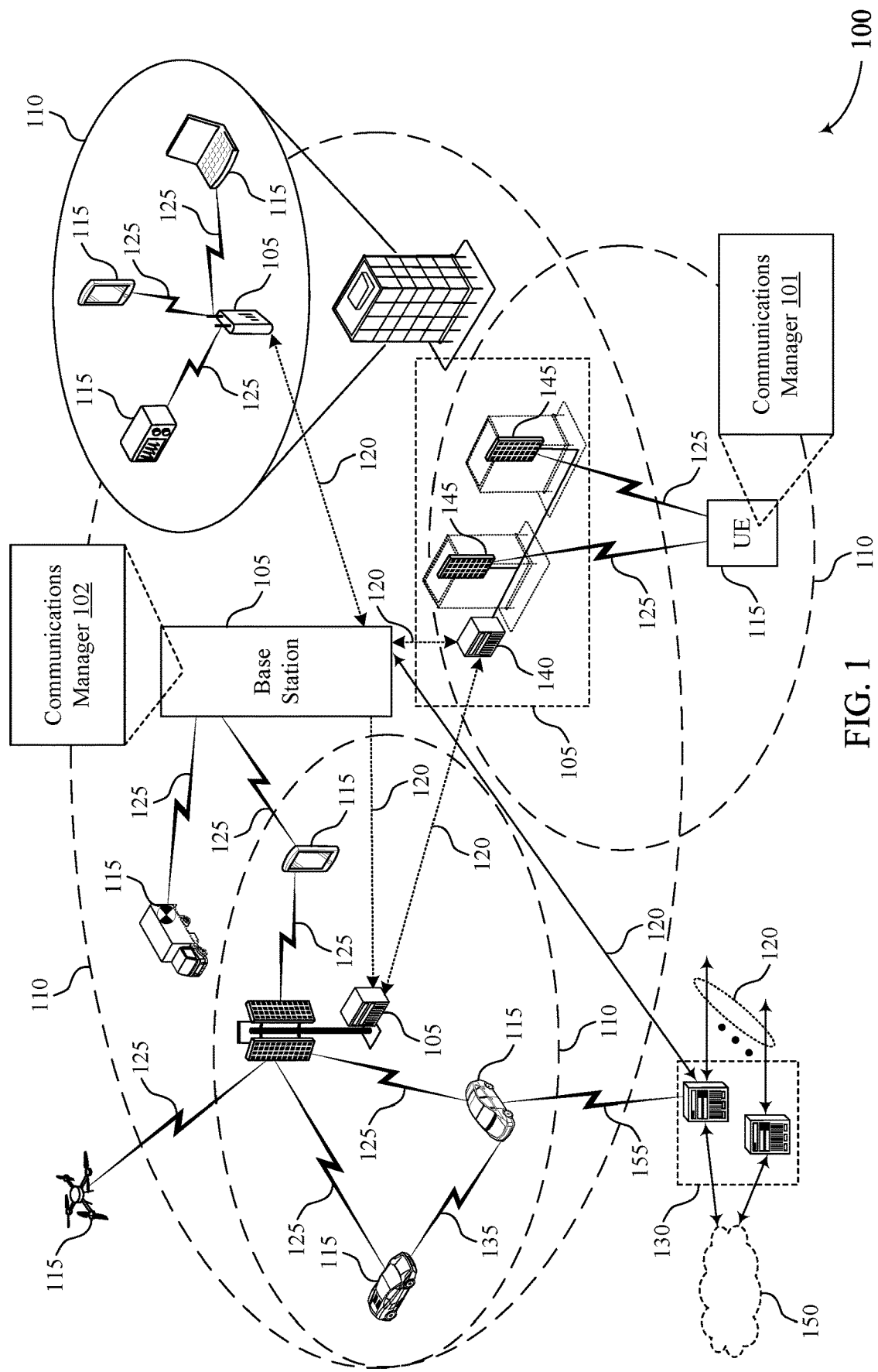
FIG. 1 illustrates an example of a system for wireless communications that supports reduced SCS windows in accordance with one or more aspects of the present disclosure.

In some wireless communications systems, a base station may utilize more than one SCS for downlink transmissions. For example, the base station may apply a first SCS for a first type of downlink transmissions (e.g., PDSCH and PDCCH transmissions). Additionally, the base station may apply a second SCS that is less than the first SCS to a second type of downlink transmissions (e.g., SSB transmissions). In some wireless communications systems, the base station may transmit the downlink transmissions with different SCSs simultaneously. That is, a transceiver of the base station may be configured to simultaneously transmit one downlink transmission having a first SCS and a second downlink transmission having a second SCS. Here, a complexity of the transceiver may be greater than a complexity of a transceiver that is not configured to transmit downlink transmissions having different SCSs simultaneously.

Alternatively, a base station may switch between transmitting downlink transmissions according to the first SCS and transmitting downlink transmissions according to the second SCS to decrease the complexity of the base station transceiver. Here, the base station may indicate, to one or more UEs (e.g., UEs that are configured to receive the downlink transmissions), a window or set of time resources associated with the second SCS. For example, the base station may indicate, to each of the UEs, a configuration indicating a time period for the UE to monitor the channel according to the second SCS. The UE may monitor the channel according to the first SCS, switch to monitoring the channel according to the second SCS for the time period indicated by the configuration, and switch back to monitoring the channel according to the first SCS after the time period. In some cases, the UE may autonomously switch from monitoring the channel according to the first SCS to monitoring the channel according to the second SCS (e.g., based on the configuration indicated by the base station). In some other cases, the UE may refrain from switching to monitoring the channel according to the second SCS until the UE receives a signal from the base station. For example, the base station may transmit DCI or a MAC-CE indicating for the UE to switch to monitoring the channel according to the second SCS. In some instances, switching between transmitting downlink transmissions according to a first SCS and transmitting downlink transmissions according to a second SCS may decrease a complexity of the base station transceiver (e.g., when compared to a base station that transmits downlink transmissions having different SCSs simultaneously) while still enabling the base station to transmit downlink transmissions with varying SCSs.

Aspects of the disclosure are initially described in the context of wireless communications systems. Aspects of the disclosure are then described in the context of SCS window configurations and a process flow. Aspects of the disclosure are further illustrated by and described with reference to apparatus diagrams, system diagrams, and flowcharts that relate to reduced SCS window.

FIG. 1 illustrates an example of a wireless communications system 100 that supports reduced SCS windows in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

In wireless communications system 100, a base station 105 may utilize more than one SCS for downlink transmissions. For example, the base station 105 may apply a first SCS for a first type of downlink transmissions (e.g., PDSCH and PDCCH transmissions). Additionally, the base station 105 may apply a second SCS that is less than the first SCS to a second type of downlink transmissions (e.g., SSB transmissions). In some examples of wireless communications system 100, the base station 105 may transmit the downlink transmissions with different SCSs simultaneously. That is, a transceiver of the base station 105 may be configured to transmit one downlink transmission having a first SCS during a first time period and a second downlink transmission having a second SCS during a second time period that at least partially overlaps with the first time period. Here, a complexity of the transceiver may be greater than a complexity of a transceiver that is not configured to transmit downlink transmissions having different SCSs simultaneously.

Alternatively, a base station 105 may switch between transmitting downlink transmissions according to the first SCS and transmitting downlink transmissions according to the second SCS to decrease the complexity of the base station transceiver. Here, the base station 105 may indicate, to one or more UEs 115 (e.g., UEs 115 that are configured to receive the downlink transmissions), a window or set of time resources associated with the second SCS. For example, the base station 105 may indicate, to each of the UEs 115, a configuration indicating a time period for the UE 115 to monitor the channel according to the second SCS. The UE 115 may monitor the channel according to the first SCS, switch to monitoring the channel according to the second SCS for the time period indicated by the configuration, and switch back to monitoring the channel according to the first SCS after the time period. In some cases, the UE 115 may autonomously switch from monitoring the channel according to the first SCS to monitoring the channel according to the second SCS (e.g., based on the configuration indicated by the base station 105). In some other cases, the UE 115 may refrain from switching to monitoring the channel according to the second SCS until the UE 115 receives a signal from the base station 105.

In various examples, a communications manager 101 or 102 may be included in a device to support a reduced SCS window. For example, a UE 115 may include a communications manager 101, or a base station 105 may include a communications manager 102.

In some examples, a communications manager 101 may monitor a set of frequency resources according to a first SCS and transmit, to a base station 105, an indication of a capability of the UE 115 to switch from the first SCS to a second SCS that is less than the first SCS. The communications manager 101 may receive, from the base station 105 in response to transmitting the indication of the capability of the UE 115, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

In some examples, a communications manager 102 may transmit one or more first downlink transmissions to a UE 115 via a set of frequency resources according to a first SCS, receive, from the UE 115, an indication of a capability of the UE 115 to switch from the first SCS to a second SCS that is less than the first SCS, and determine a configuration for the UE 115 to monitor the set of frequency resources according to the second SCS based on the capability of the UE 115 to switch from the first SCS to the second SCS. The communications manager 102 may transmit, to the UE 115 in response to receiving the indication of the capability of the UE 115, signaling that indicates the configuration for monitoring the set of frequency resources according to the second SCS, and transmit, to the UE 115, ones or more second downlink transmissions via the set of frequency resources according to the second SCS based on transmitting the signaling that indicates the configuration.

Figure 2:
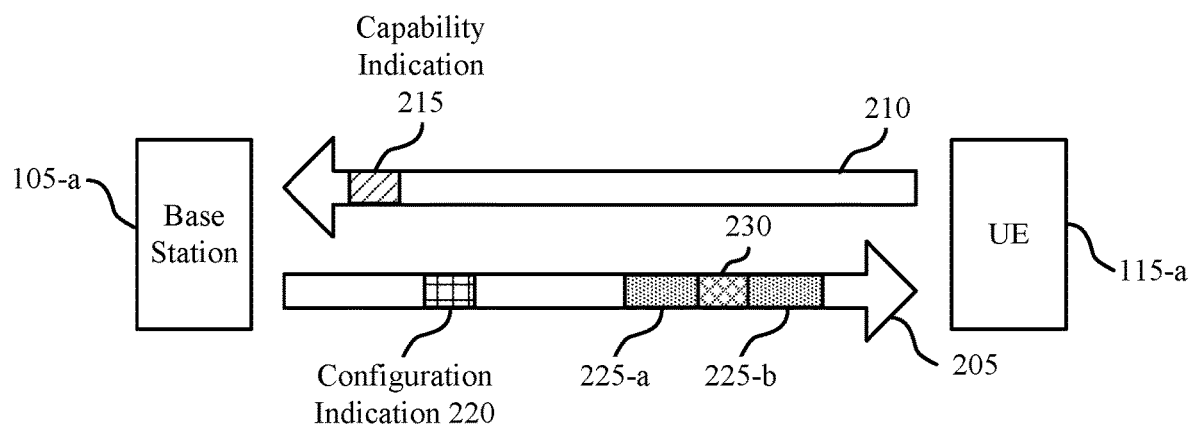
FIG. 2 illustrates an example of a wireless communications system that supports reduced SCS windows in accordance with one or more aspects of the present disclosure.

FIG. 2 illustrates an example of a wireless communications system 200 that supports reduced SCS windows in accordance with one or more aspects of the present disclosure. In some examples, the wireless communications system 200 may implement aspects of wireless communications system 100, such as base station 105-a and UE 115-a, which may be examples of the base stations 105 and UEs 115, respectively, as described with reference to FIG. 1.

The base station 105-a and the UE 115-a may be in communication by the downlink channel 205 and the uplink channel 210. In some cases, the downlink channel 205 and the uplink channel 210 may span a same set of frequency resources. Alternatively, the downlink channel 205 and the uplink channel 210 may span different sets of frequency resources. In some cases, the downlink channel 205 may span a set of frequency resources in a high frequency (e.g., 57 GHz-71 GHz).

The base station 105-a may utilize more than one SCS for downlink transmissions to the UE 115-a. For example, the base station 105-a may transmit downlink transmissions 225-a and downlink transmissions 225-b to the UE 115-a using a first SCS. Additionally, the base station 105-a may transmit downlink transmissions 230 to the UE 115-a using a second SCS different than (e.g., less than, greater than) the first SCS. In some cases, the first downlink transmissions 225 may be PDCCH or PDSCH transmissions and the second downlink transmissions 230 may be SSB transmissions.

The base station 105-a may switch from transmitting downlink transmissions 225-a using the first SCS to transmitting downlink transmissions 230 using the second SCS. The first SCS may be larger than the second SCS. For example, the first SCS may be 960 kHz, 1920 kHz, or 3840 kHz while the second SCS may be 120 kHz or 240 kHz. In some cases, the larger SCS may increase a reliability of the downlink transmissions 225 when compared to downlink transmissions 225 transmitted using a smaller SCS. For example, a larger SCS may result in downlink transmissions 225 that may be more robust and may mitigate phase noise. Additionally, the base station 105-a may utilize the first SCS for the downlink transmission 225 such that a fast Fourier transformation (FFT) size utilized by the base station 105-a and the UE 115-a for the downlink transmissions 225 may be the same FFT size used for PDSCH and PDCCH transmissions in other frequency bands. In some cases, the reduced or second SCS may increase a coverage of the SSB downlink transmissions 230, reduce an acquisition time, and decrease a complexity of the UE 115-a.

In some cases, using a reduced SCS while maintaining the FFT size may result in an incomplete usage of a BW.

The base station 105-a may indicate a second SCS window (e.g., a reduced SCS window) to the UE 115-a, which may indicate a set of time resources for the UE 115-a to monitor the downlink channel 205 according to the second SCS. In some cases, the second SCS window may span at least a portion of the time resources associated with the downlink transmission 230. The base station 105-a may identify a configuration for the second SCS window based on a capability of the UE 115-a. That is the UE 115-a may transmit a capability indication 215 to the base station 105-a, which may indicate an amount of time for the UE 115-a to switch from monitoring the downlink channel 205 according to the first SCS to monitoring the downlink channel 205 according to the second SCS (e.g., a switching time of the UE 115-a). For example, it may take a UE 115-a a period of time (e.g., 1 microsecond) to switch from monitoring according to a first SCS to monitoring the downlink channel 205 according to a second SCS. The base station 105-a may identify a second SCS window for the UE 115-a based on the capability of the UE 115-a indicated by the capability indication 215. For example, if the UE 115-a reports a relatively low switching time (e.g., the UE 115-a can switch from monitoring according to one SCS to another SCS relatively quickly), the base station 105-a may configure the UE 115-a with a higher quantity of second SCS windows that may span a smaller duration of time when compared to a UE 115-a that reports a relatively high switching time. Here, the base station 105-a may configure the UE 115-a with a lower quantity of second SCS windows that span a longer duration of time. In some cases, the base station 105-a and the UE 115-a may use the second SCS while maintaining an FFT size. Maintaining the FFT size may result in an incomplete usage of the bandwidth. As such, the base station 105-a may further configure the UE 115-a with one or more additional BWPs. For example, the base station 105-a may transmit, to the UE 115-a, an indication of the one or more additional BWPs within a random access channel (RACH) message, an RRC message, or the like.

In some cases, the base station 105-a may identify the configuration for the second SCS window based on one or more additional factors (e.g., in addition to the capability of the UE 115-a). For example, the base station 105-a may identify the configuration for the second SCS window based on a numerology of the downlink channel 205, a capability of one or more other UEs 115, and a capability of the base station 105-a.

The base station 105-a may indicate the configuration for monitoring the downlink channel 205 to the UE 115-a by the configuration indication 220. For example, the base station 105-a may transmit the configuration indication 220 within an RRC message or within a systems information message, such as a system information block (SIB), a master information block (MIB), or the like. In some examples, the configuration indication 220 may include one or more values, including at least one default value, for a second SCS window. In some examples, the base station 105-a may send the configuration indication 220 in a broadcast message, a unicast message, or the like. In any case, the second SCS window may span at least a portion of the time resources associated with the downlink transmission 230 that the base station 105-a transmits according to the second SCS. The downlink transmissions 230 may correspond to a set of SSB transmissions. In some cases, the base station 105-a may transmit a set of SSB downlink transmissions 230 (e.g., a burst of SSB transmissions) by one or more beams. Here, the configuration indication 220 may indicate a second SCS window including one or more SSB transmission opportunities. In some cases, the configuration indication 220 may indicate a set of time resources of the second SCS window. Here, the UE 115-a may switch from monitoring the downlink channel 205 according to the first SCS to monitoring the downlink channel 205 according to the second SCS during the set of time resources indicated by the configuration indication 220. In some other cases, the configuration indication 220 may include a bitmap, where each bit of the bitmap corresponds to one of the SSB transmission opportunities. Thus, the configuration indication 220 may indicate a portion of the SSB transmission opportunities for the UE 115-a to monitor using the second SCS. Here, the UE 115-a may switch to monitoring the downlink channel 205 using the second SCS during the indicated SSB transmission opportunities.

In some cases, the configuration indication 220 may indicate for the UE 115-a to autonomously switch from monitoring the downlink channel 205 using the first SCS to monitoring the downlink channel 205 using the second SCS. Additionally, the configuration indication 220 may indicate for the UE 115-*a* to refrain from switching to monitoring the downlink channel 205 according to the second SCS until the UE 115-*a* receives a signal (e.g., a trigger) from the base station 105-*a*. Here, the base station 105-*a* may transmit the signal to the UE 115-*a* prior to the second SCS window. For example, the base station 105-*a* may transmit the signal within DCI (e.g., by L1 signaling) or within a MAC CE (e.g., by L2 signaling). If the UE 115-*a* receives the signal, the UE 115-*a* may switch to monitoring the downlink channel 205 according to the second SCS to receive one or more of the downlink transmissions 230. Additionally, if the UE 115-*a* does not receive the signal (e.g., if the base station 105-*a* does not transmit the signal) prior to the second SCS window, the UE 115-*a* may not monitor the downlink channel 205 according to the second SCS and may not receive the downlink transmissions 230. In some cases, the UE 115-*a* may instead enter a sleep state during the second SCS window (e.g., the UE 115-*a* may refrain from monitoring the downlink channel 205 during the second SCS window).

After receiving the configuration indication 220, the UE 115-*a* may switch from monitoring the downlink channel 205 according to the first SCS to monitoring the downlink channel 205 according to the second SCS during the second SCS window. For example, the UE 115-*a* may monitor the downlink channel 205 according to the first SCS and receive one or more downlink transmissions 225-*a* transmitted by the base station 105-*a* according to the first SCS. Based on the configuration of the second SCS window indicated by the configuration indication 220, the UE 115-*a* may switch to monitoring the downlink channel 205 according to the second SCS. Thus, the UE 115-*a* may receive one or more of the downlink transmissions 230 transmitted by the base station 105-*a* according to the second SCS. After the second SCS window, the UE 115-*a* may switch back to monitoring the downlink channel 205 according to the first SCS. Thus, the UE 115-*a* may receive one or more of the downlink transmissions 225-*a* transmitted by the base station 105-*a* according to the first SCS.

Figure 3A:
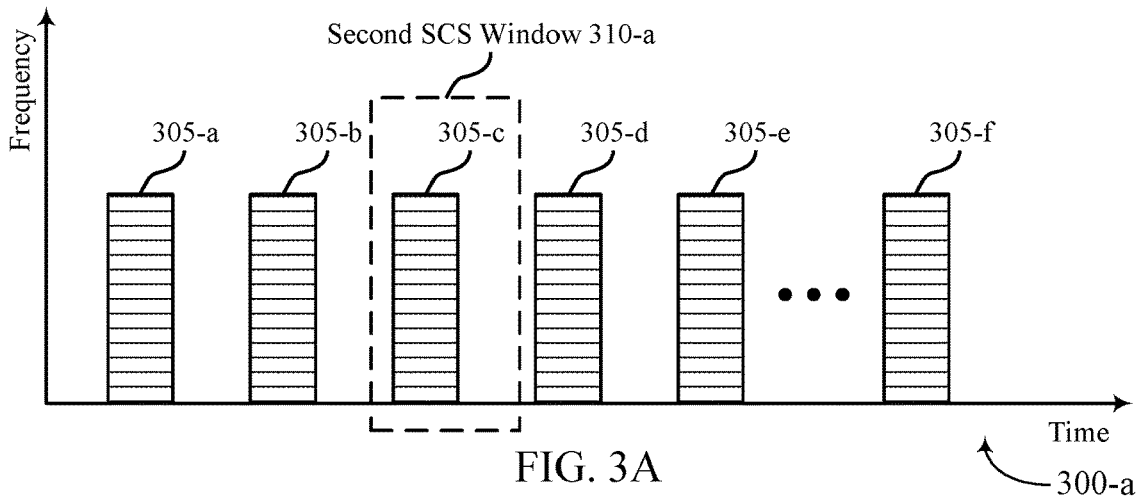
FIGS. 3A through 3C illustrate examples of SCS window configurations that support reduced SCS window in accordance with one or more aspects of the present disclosure.
Figure 3B:
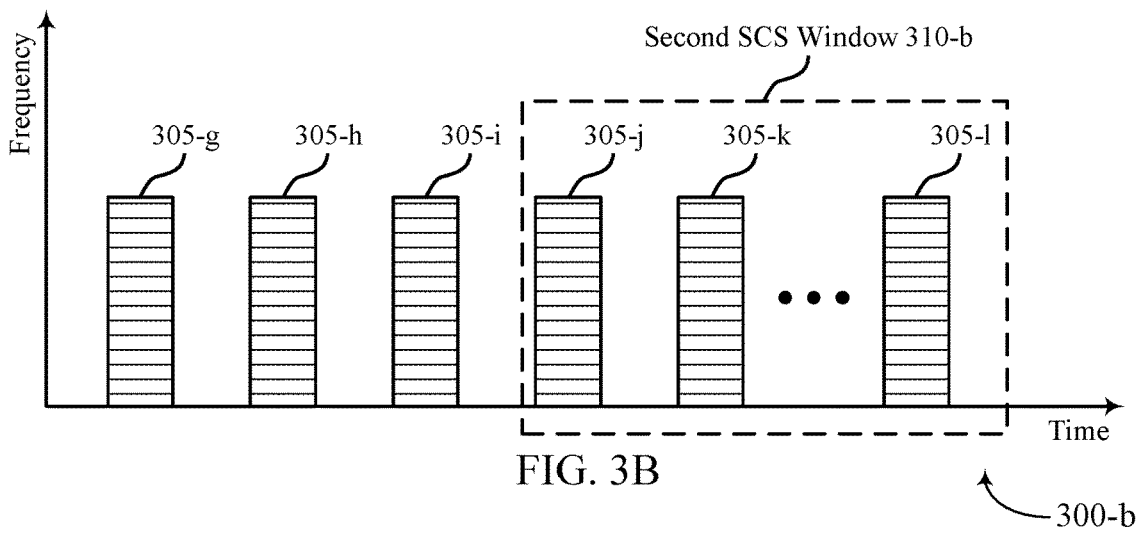
Figure 3C:
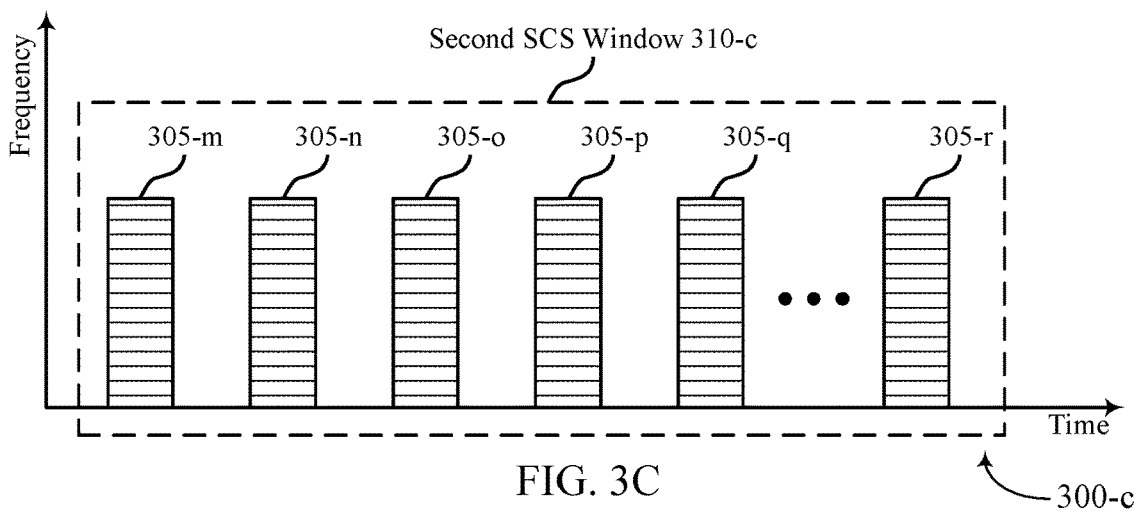

FIGS. 3A through 3C illustrate examples of SCS window configurations 300 that supports reduced SCS windows in accordance with one or more aspects of the present disclosure. In some examples, the SCS window configurations 300 may implement aspects of wireless communications system 100. For example, a base station may indicate one of the SCS window configurations 300 by transmitting a configuration indication 220 as described with reference to FIG. 2. Additionally, each SCS window configuration 300 may indicate a second SCS window 310 which may be an example of a reduced SCS window as described with reference to FIG. 2.

Each of the SCS window configurations 300 indicates a second SCS window 310 including at least one SSB transmission opportunity 305 within a burst of SSB transmissions. The second SCS window 310 may correspond to a set of time resources that a UE is to monitor the set of resources according to the second SCS. That is, the UE may switch from monitoring the set of frequency resources according to a first SCS to monitoring the set of frequency resources according to the second SCS during the second SCS window 310. In some cases, the UE may autonomously switch to monitoring the set of frequency resources during the second SCS window 310. Alternatively, the UE may switch to monitoring the second set of frequency resources during the second SCS window 310 if the UE receives explicit signaling from the base station (e.g., layer 1 (L1) signaling, layer 2 (L2) signaling)).

FIG. 3A illustrates an SCS window configuration 300-*a* that indicates the second SCS window 310-*a*. In the example of SCS window configuration 300-*a*, the second SCS window 310-*a* may include a single SSB transmission opportunity 305-*c*. A UE may switch from monitoring a set of resources according to a first SCS to monitoring the set of frequency resources according to the second SCS for the second SCS window 310-*a*. In some cases, the UE may receive an SSB transmission transmitted by the base station during the SSB transmission opportunity 305-*c*. In some cases, a base station may indicate the SCS window configuration 300-*a* to the UE by a bitmap. Here, the bitmap may include a bit associated with each of the SSB transmission opportunities 305 and a bit corresponding to the SSB transmission opportunity 305-*c* may indicate that the UE is to monitor the set of frequency resources associated with the SSB transmission opportunity 305-*c* according to the second SCS.

FIG. 3B illustrates an SCS window configuration 300-*b* that indicates the second SCS window 310-*b*. In the example of SCS window configuration 300-*b*, the second SCS window 310-*a* may include a subset of the SSB transmission opportunity 305 within the set of SSB transmissions. For example, the set of SSB transmissions may include a first quantity of SSB transmission opportunities 305 (e.g., 64 SSB transmission opportunities 305). Here, the second SCS window 310-*b* may include a second quantity of SSB transmission opportunities 305 that is less than the first quantity of SSB transmission opportunities 305. In the example of SCS window configuration 300-*b*, the second SCS window 310-*b* includes a set of contiguous SSB transmission opportunities 305 (e.g., contiguous in the time domain). In some other examples, the second SCS window 310-*b* may include a set of SSB transmission opportunities 305 that are not contiguous in the time domain. For example, the second SCS window 310-*b* may additionally include SSB transmission opportunity 305-*g*. In either case, the UE may monitor a set of frequency resources according to a second SCS during the second SCS window 310-*b*.

In some cases, a base station may indicate the SCS window configuration 300-*b* to the UE by a bitmap. Here, the bitmap may include a bit associated with each of the SSB transmission opportunities 305 and a bit corresponding to the SSB transmission opportunities 305-*j* and the SSB transmission opportunities 305-*k* to 305-*l* may indicate that the UE is to monitor the set of frequency resources associated with the SSB transmission opportunities 305-*j* and SSB transmission opportunities 305-*k* to 305-*l* according to the second SCS.

FIG. 3C illustrates an SCS window configuration 300-*c* that indicates the second SCS window 310-*c*. In the example of SCS window configuration 300-*c*, the second SCS window 310-*c* may include all of the SSB transmission opportunities 305 within the SSB transmission burst. Here, a UE may switch from monitoring a set of resources according to a first SCS to monitoring the set of frequency resources according to the second SCS for the second SCS window 310-*c* which includes all of the SSB transmission opportunities 305 within a set of SSB transmissions (e.g., the burst of SSB transmissions). In some cases, a base station may indicate the SCS window configuration 300-*c* to the UE by a bitmap. Here, the bitmap may include a bit associated with each of the SSB transmission opportunities 305 and each bit may indicate that the UE may monitor each of the SSB transmission opportunities 305 according to the second SCS.

Figure 4:
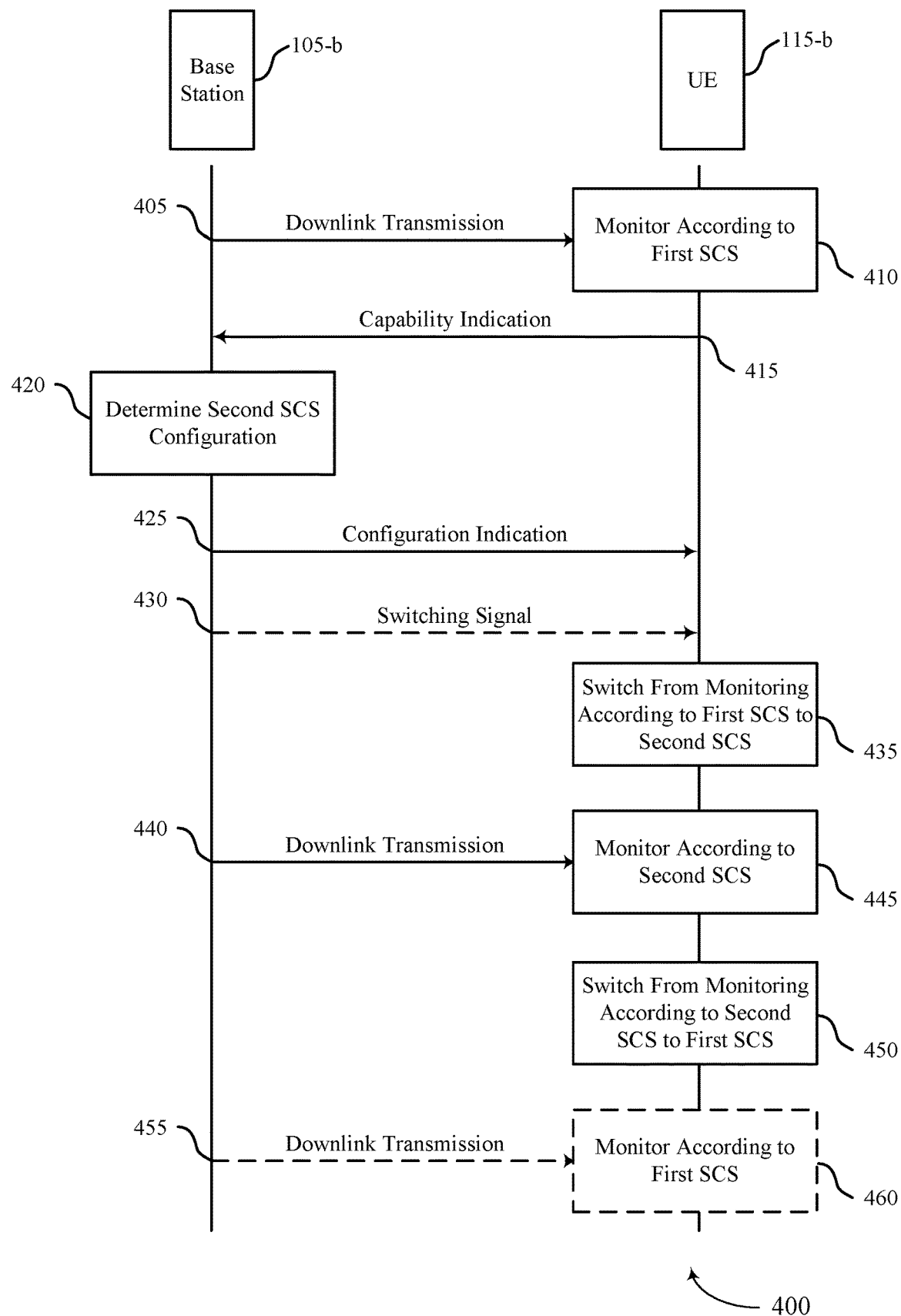
FIG. 4 illustrates an example of a process flow that supports reduced SCS windows in accordance with one or more aspects of the present disclosure.

FIG. 4 illustrates an example of a process flow 400 that supports reduced SCS windows in accordance with one or more aspects of the present disclosure. In some examples, the process flow 400 may implement aspects of wireless communications system 100, such as base station 105-*b* and UE 115-*b*, which may be examples of the base stations 105 and UEs 115, respectively, as described with reference to FIGS. 1 and 2.

At 405, the base station 105-*b* may transmit, by a set of frequency resources, one or more downlink transmissions (e.g., first downlink transmissions) according to a first SCS. In some cases, the set of frequency resources may correspond to a downlink channel. In some cases, the downlink transmissions may be PDSCH or PDCCH transmissions.

At 410, the UE 115-*b* may monitor the set of frequency resources according to the first SCS. In some cases, the UE 115-*b* may receive a PDSCH or PDCCH transmission from the base station 105-*b* based on monitoring the set of frequency resources according to the first SCS.

At 415, the UE 115-*b* may transmit, to the base station 105-*b*, an indication of a capability of the UE 115-*b* to switch from the first SCS to a second SCS that is less than the first SCS. For example, the UE 115-*b* may indicate, to the base station 105-*b*, an amount of for the UE 115-*b* to switch from the first SCS to the second SCS (e.g., an amount of time it takes the UE 115-*b* to switch from monitoring the set of frequency resources according to the first SCS to monitoring the set of frequency resources according to the second SCS).

At 420, the base station 105-*b* may determine a configuration for the UE 115-*b* to monitor the set of frequency resources according to the second SCS based on the capability of the UE 115-*a* to switch from the first SCS to the second SCS. For example, the base station 105-*b* may determine a second SCS window configuration for the UE 115-*b*. In some cases, the base station 105-*b* may determine the configuration based on one or more other factors. For example, the base station 105-*b* may determine the configuration based on a numerology of the set of frequency resources, a capability of other UEs 115 in communication with the base station 105-*b*, and a capability of the base station 105-*b*.

At 425, the base station 105-*b* may transmit signaling that indicates a configuration for monitoring the set of frequency resources according to the second SCS (e.g., in response to the indication of the capability of the UE 115-*b*). For example, the base station 105-*b* may transmit an RRC message to the UE 115-*b* indicating the configuration. In another example, the base station 105-*b* may transmit system information to the UE 115-*b* indicating the configuration. In some cases, the signaling that indicates the configuration may include a bitmap. Here, each bit of the bitmap may indicate, to the UE 115-*b*, whether the UE 115-*b* is to monitor the set of frequency resources during a time period associated with an SSB transmission within a burst of SSB transmissions.

At 430, the base station 105-*b* may optionally transmit a signal that indicates for the UE 115-*b* to switch from monitoring the set of frequency resources according to the first SCS to monitoring the set of frequency resources according to the second SCS. For example, the UE 115-*b* may determine, based on the received configuration, to refrain from switching to the second SCS until receiving a signal that indicates the switch. At 430, the base station 105-*b* may transmit the signal to the UE 115-*b*. For example, the base station 105-*b* may transmit DCI to the UE 115-*b* indicating the switch. Additionally, the base station 105-*b* may transmit a MAC-CE to the UE 115-*b* indicating the switch.

At 435, the UE 115-*b* may switch from monitoring the set of frequency resources according to the first SCS to monitoring the set of frequency resources according to the second SCS based on the received configuration for monitoring the set of frequency resources. In a case that the base station 105-*b* transmits the signal that indicates for the UE 115-*b* to switch, the UE 115-*b* may switch to monitoring the set of frequency resources according to the SCS based on receiving the signal at 430. In another case, the UE 115-*b* may determine to autonomously switch to the second SCS based on receiving the configuration from the base station 105-*b* at 425. Here, the UE 115-*a* may autonomously switch to monitoring the set of frequency resources according to the second SCS.

At 440, the base station 105-*b* may transmit one or more second downlink transmissions according to the second SCS. For example, the base station 105-*b* may transmit a set of SSB transmissions (e.g., a burst of SSB transmissions) to one or more UEs 115 (e.g., include the UE 115-*b*) using the second SCS.

At 445, the UE 115-*b* may monitor the set of frequency resources according to the second SCS for a duration of time indicated by the received configuration. In some cases, the UE 115-*b* may receive one or more SSB transmissions from the base station 105-*b* based on monitoring the set of frequency resources according to the second SCS. In some cases, the duration of time may span one SSB transmission opportunity. In another case, the duration of time may span a subset of SSB transmission opportunities within a burst of SSB transmission opportunities. Additionally, the duration of time may span all of the SSB transmission opportunities within the burst of SSB transmission opportunities.

At 450, the UE 115-*b* may switch, after the duration of time, from monitoring the set of frequency resources according to the second SCS to monitoring the set of frequency resources according to the first SCS.

At 455, the base station 105-*b* may optionally transmit one or more downlink transmissions according to the first SCS. For example, the base station 105-*b* may transmit one or more PDCCH or PDSCH transmissions to the UE 115-*b* using the first SCS.

At 460, the UE 115-*b* may optionally monitor the set of frequency resources according to the first SCS. Here, the UE 115-*b* may receive a PDCCH transmission, a PDSCH transmission, or both from the base station 105-*b* based on monitoring the set of frequency resources according to the first SCS.

Figure 5:
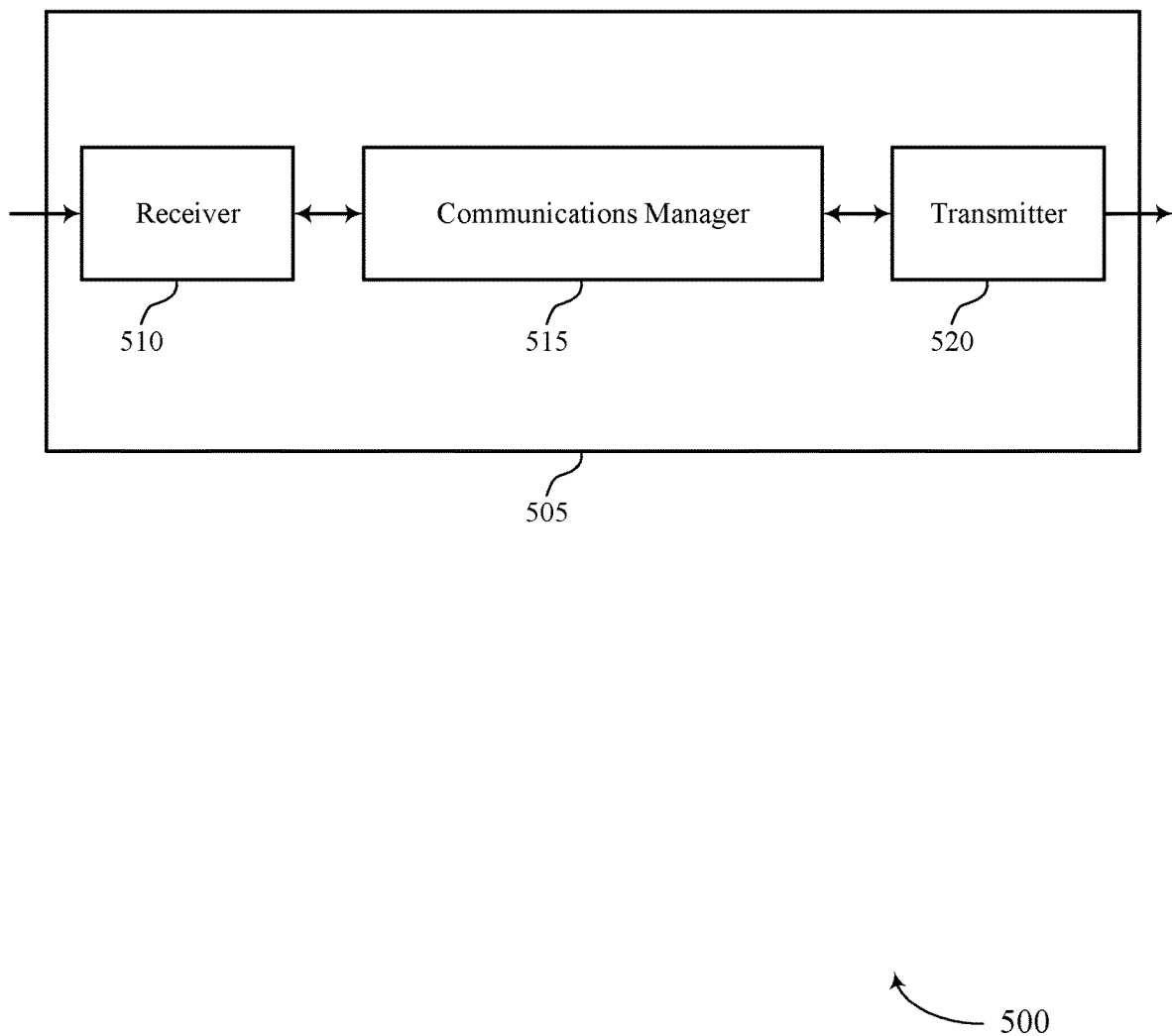
FIGS. 5 and 6 show block diagrams of devices that support reduced SCS window in accordance with one or more aspects of the present disclosure.

FIG. 5 shows a block diagram 500 of a device 505 that supports reduced SCS windows in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (control channels, data channels, and information related to reduced SCS window, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may monitor a set of frequency resources according to a first SCS and transmit, to a base station, an indication of a capability of the UE to switch from the first SCS to a second SCS that is less than the first SCS. The communications manager 515 may receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for a more efficient reception mechanism such that the UE may receive signaling during a reduced SCS window.

Figure 6:
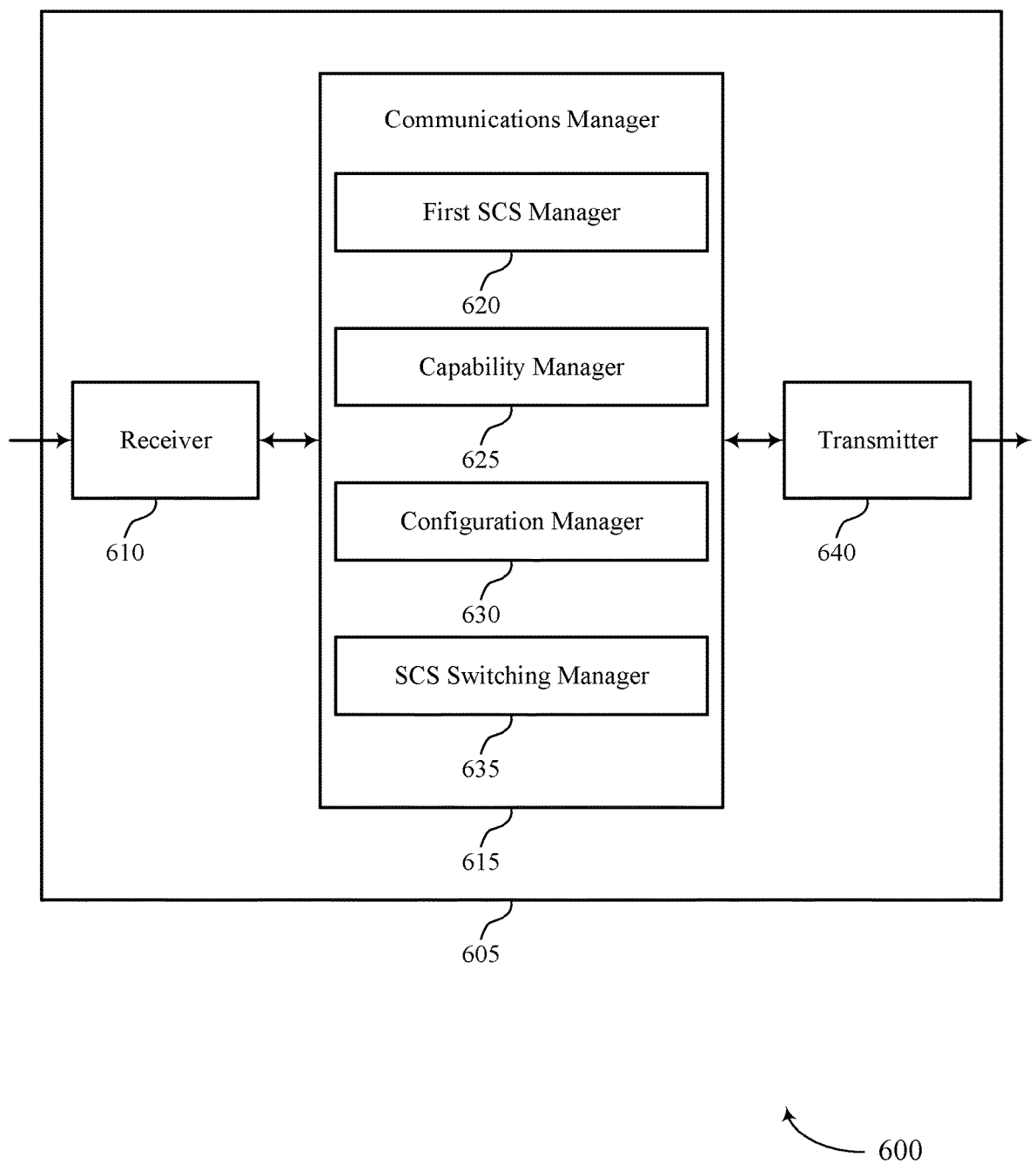

FIG. 6 shows a block diagram 600 of a device 605 that supports reduced SCS windows in accordance with one or more aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (control channels, data channels, and information related to reduced SCS window, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a first SCS manager 620, a capability manager 625, a configuration manager 630, and an SCS switching manager 635. The communications manager 615 may be an example of aspects of the communications manager 810 described herein.

The first SCS manager 620 may monitor a set of frequency resources according to a first SCS.

The capability manager 625 may transmit, to a base station, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS.

The configuration manager 630 may receive, from the base station in response to transmitting the indication of the capability of the UE, signaling that indicates a configuration for monitoring the set of frequency resources according to the second SCS.

The SCS switching manager 635 may switch from monitoring the set of frequency resources according to the first SCS to monitoring the set of frequency resources according to the second SCS based on the received configuration for monitoring the set of frequency resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
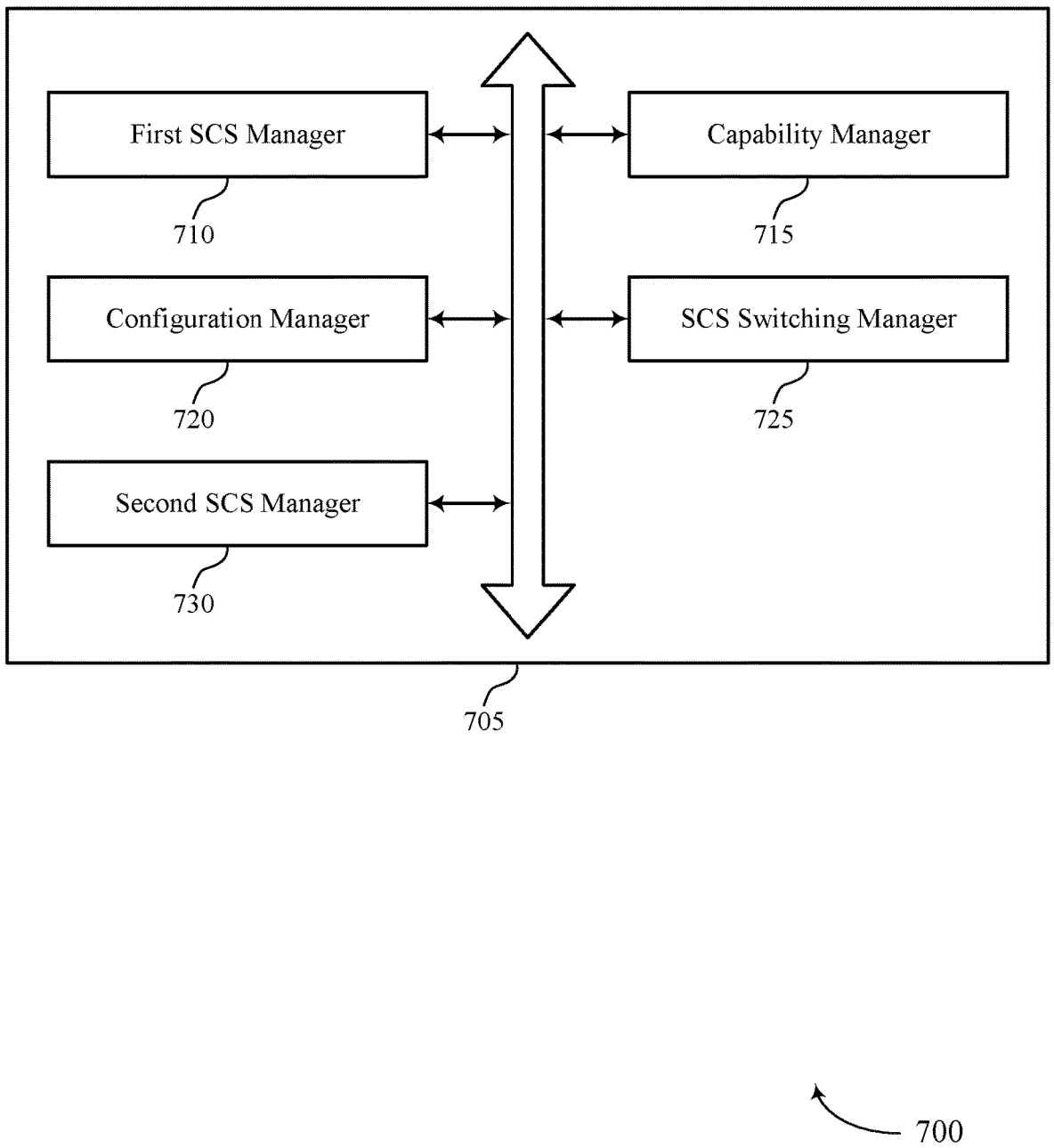
FIG. 7 shows a block diagram of a communications manager that supports reduced SCS windows in accordance with one or more aspects of the present disclosure.

FIG. 7 shows a block diagram 700 of a communications manager 705 that supports reduced SCS windows in accordance with one or more aspects of the present disclosure. The communications manager 705 may be an example of aspects of a communications manager 515, a communications manager 615, or a communications manager 810 described herein. The communications manager 705 may include a first SCS manager 710, a capability manager 715, a configuration manager 720, an SCS switching manager 725, and a second SCS manager 730. Each of these modules may communicate, directly or indirectly, with one another (e.g., via one or more buses).

The first SCS manager 710 may monitor a set of frequency resources according to a first SCS. In some examples, the first SCS manager 710 may monitor the set of frequency resources according to the first SCS for a PDCCH transmission, a PDSCH transmission, or a combination thereof.

The capability manager 715 may transmit, to a base station, an indication of a capability of the UE to switch from the first SCS to a second SCS that is less than the first SCS. In some cases, the indication of the capability of the UE to switch from the first SCS to the second SCS indicates an amount of time for the UE to switch from the first SCS to the second SCS.

The configuration manager 720 may receive, from the base station in response to transmitting the indication of the capability of the UE, signaling that indicates a configuration for monitoring the set of frequency resources according to the second SCS. In some examples, the configuration manager 720 may receive an RRC message from the base station, where receiving the signaling that indicates the configuration for monitoring the set of frequency resources is based on receiving the RRC message. In some cases, the configuration manager 720 may receive system information from the base station, where receiving the signaling that indicates the configuration for monitoring the set of frequency resources is based on receiving the system information. In some instances, the signaling that indicates the configuration for monitoring the set of frequency resources according to the second SCS includes a bitmap. Here, each bit of the bitmap may indicate whether the UE is to monitor the set of frequency resources during a time period associated with an SSB transmission within a burst of SSB transmissions.

The SCS switching manager 725 may switch from monitoring the set of frequency resources according to the first SCS to monitoring the set of frequency resources according to the second SCS based on the received configuration for monitoring the set of frequency resources. In some cases, the SCS switching manager 725 may switch, after the duration of time, from monitoring the set of frequency resources according to the second SCS to monitoring the set of frequency resources according to the first SCS based on the received configuration for monitoring the set of frequency resources.

In some examples, the SCS switching manager 725 may determine, based on the received configuration for monitoring the set of frequency resources, to refrain from the switching until receiving a signal that indicates a switch from monitoring the set of frequency resources according to the first SCS to monitoring the set of frequency resources according to the second SCS. That is, the SCS switching manager 725 may refrain, based on the received configuration for monitoring the set of frequency resources, from the switching until receiving a signal that indicates a switch from monitoring the set of frequency resources according to the first SCS to monitoring the set of frequency resources according to the second SCS. Here, the SCS switching manager 725 may receive, from the base station, the signal that indicates the switch, where the switching is based on receiving the signal that indicates the switch. In some examples, the SCS switching manager 725 may receive DCI from the base station, where receiving the signal that indicates the switch is based on receiving the DCI. Additionally, the SCS switching manager 725 may receive a MAC-CE from the base station, where receiving the signal that indicates the switch is based on receiving the MAC-CE.

In some examples, the SCS switching manager 725 may determine, based on the received configuration for monitoring the set of frequency resources, to autonomously switch from monitoring the set of frequency resources according to the first SCS to monitoring the set of frequency resources according to the second SCS, where the switching is based on determining to autonomously switch.

The second SCS manager 730 may monitor, based on the switching, the set of frequency resources according to the second SCS for a duration of time indicated by the received configuration for monitoring the set of frequency resources. In some cases, the duration of time spans one SSB transmission opportunity within a burst of SSB transmission opportunities. In some instances, the duration of time spans a subset of SSB transmission opportunities within a burst of SSB transmission opportunities. In some examples, the duration of time includes each SSB transmission opportunity within a burst of SSB transmission opportunities.

Figure 8:
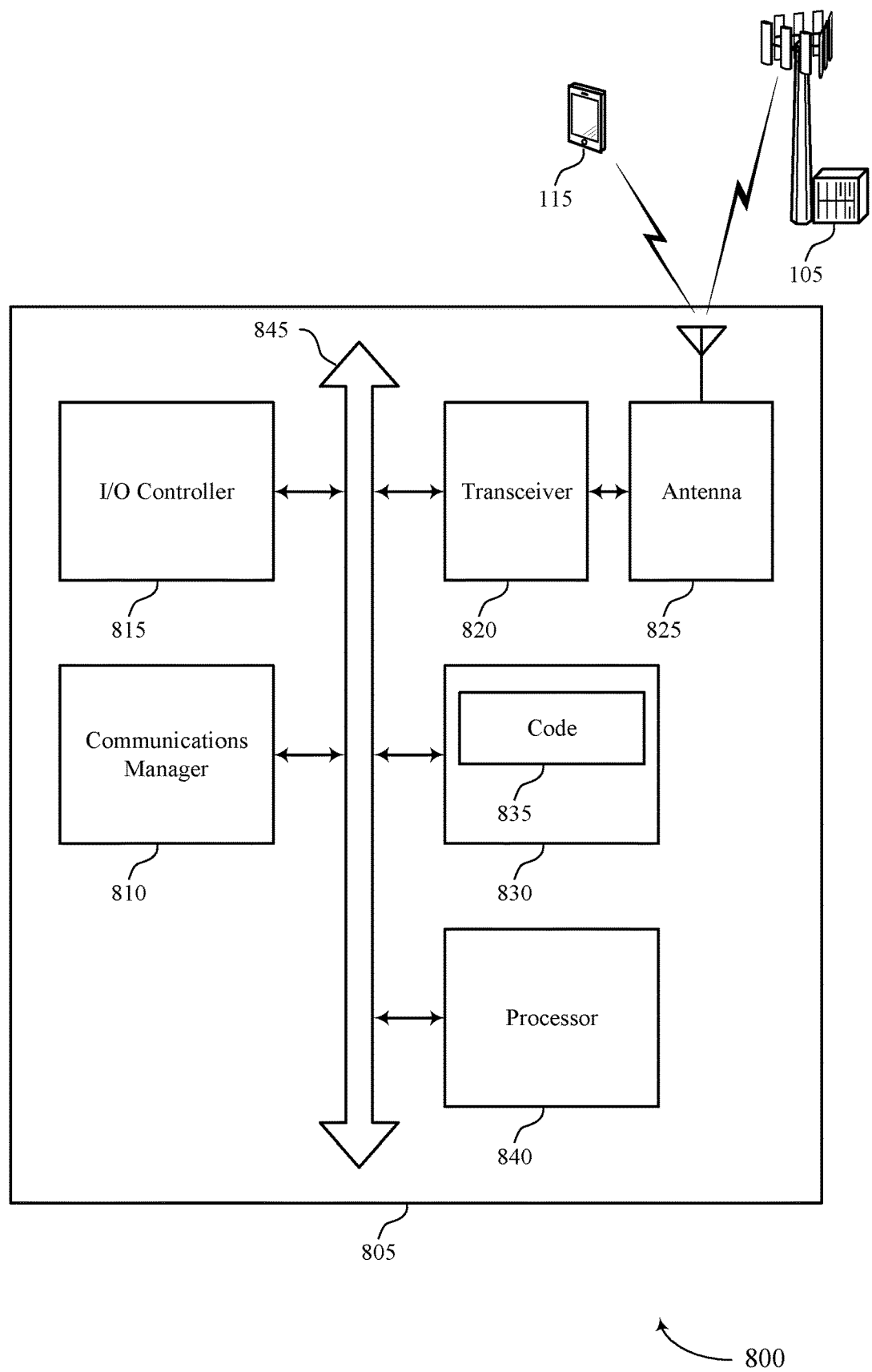
FIG. 8 shows a diagram of a system including a device that supports reduced SCS windows in accordance with one or more aspects of the present disclosure.

FIG. 8 shows a diagram of a system 800 including a device 805 that supports reduced SCS windows in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may monitor a set of frequency resources according to a first SCS, and transmit, to a base station, an indication of a capability of the UE to switch from the first SCS to a second SCS that is less than the first SCS. The communications manager 810 may receive, from the base station in response to transmitting the indication of the capability of the UE, signaling that indicates a configuration for monitoring the set of frequency resources according to the second SCS, and switch from monitoring the set of frequency resources according to the first SCS to monitoring the set of frequency resources according to the second SCS based on the received configuration for monitoring the set of frequency resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reduced SCS window).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

By including or configuring the communications manager 810 in accordance with examples as described herein, the device 805 may support techniques for enhanced system signaling allowing for a UE to switch from a first SCS to a second SCS during a reduced SCS window which may increase throughput at the UE.

Figure 9:
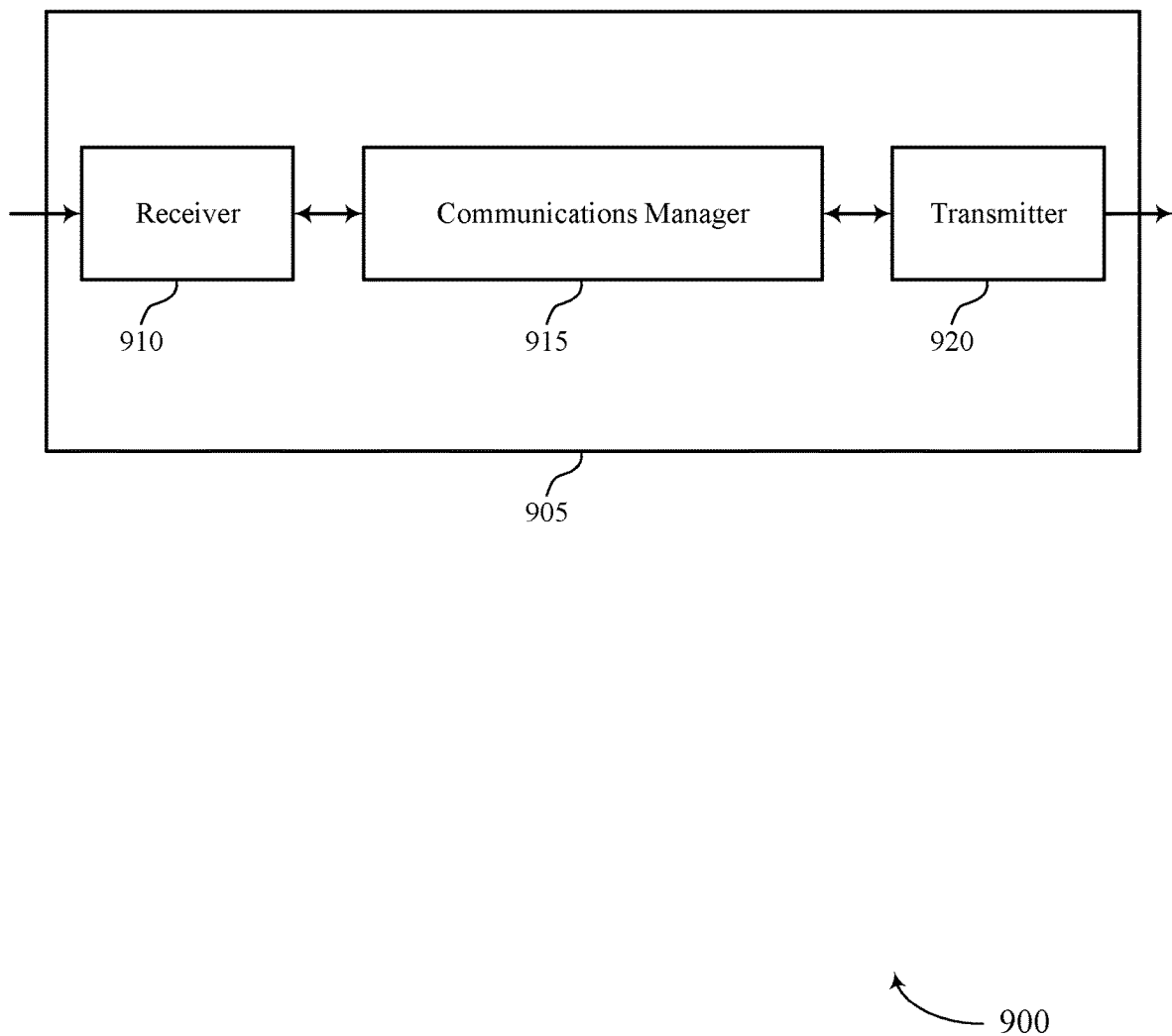
FIGS. 9 and 10 show block diagrams of devices that support reduced SCS window in accordance with one or more aspects of the present disclosure.

FIG. 9 shows a block diagram 900 of a device 905 that supports reduced SCS windows in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (control channels, data channels, and information related to reduced SCS window, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit one or more first downlink transmissions to a UE via a set of frequency resources according to a first SCS, receive, from the UE, an indication of a capability of the UE to switch from the first SCS to a second SCS that is less than the first SCS, and determine a configuration for the UE to monitor the set of frequency resources according to the second SCS based on the capability of the UE to switch from the first SCS to the second SCS. The communications manager 915 may transmit, to the UE in response to receiving the indication of the capability of the UE, signaling that indicates the configuration for monitoring the set of frequency resources according to the second SCS, and transmit, to the UE, one or more second downlink transmissions via the set of frequency resources according to the second SCS based on transmitting the signaling that indicates the configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 (e.g., a processor controlling or otherwise coupled to the receiver 910, the transmitter 920, the communications manager 915, or a combination thereof) may support techniques for a more efficient transmission mechanism such that the base station may transmit signaling during a reduced SCS window, reducing wasted resources and increasing throughput.

Figure 10:
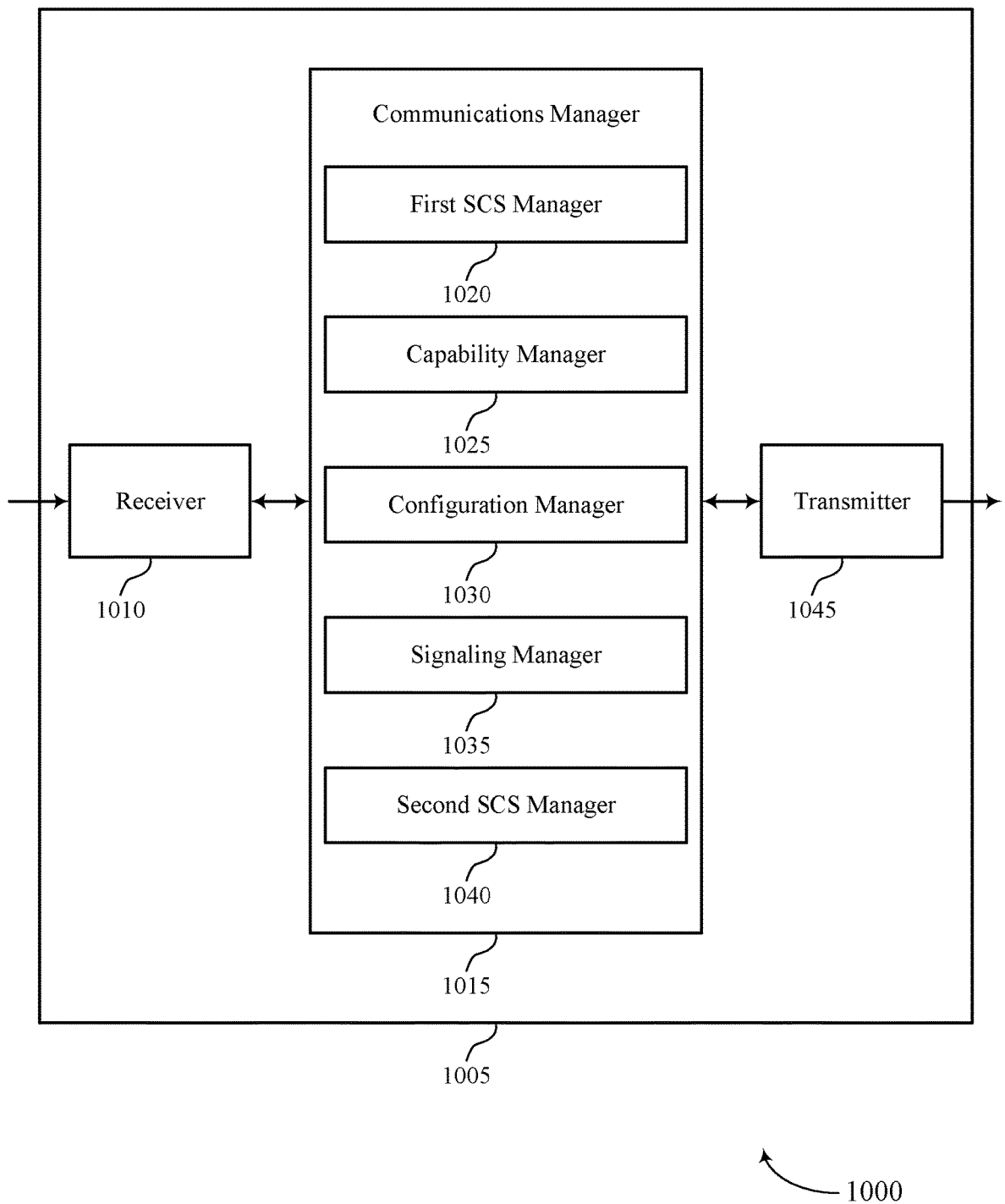

FIG. 10 shows a block diagram 1000 of a device 1005 that supports reduced SCS windows in accordance with one or more aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (control channels, data channels, and information related to reduced SCS window, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a first SCS manager 1020, a capability manager 1025, a configuration manager 1030, a signaling manager 1035, and a second SCS manager 1040. The communications manager 1015 may be an example of aspects of the communications manager 1210 described herein.

The first SCS manager 1020 may transmit one or more first downlink transmissions to a UE via a set of frequency resources according to a first SCS.

The capability manager 1025 may receive, from the UE, an indication of a capability of the UE to switch from the first SCS to a second SCS that is less than the first SCS, where the indication of the capability of the UE to switch from the first SCS to the second SCS indicated an amount of time for the UE to switch from the first SCS to the second SCS.

The configuration manager 1030 may determine a configuration for the UE to monitor the set of frequency resources according to the second SCS based on the capability of the UE to switch from the first SCS to the second SCS.

The signaling manager 1035 may transmit, to the UE in response to receiving the indication of the capability of the UE, signaling that indicates the configuration for monitoring the set of frequency resources according to the second SCS, based on the capability of the UE to switch from the first SCS to the second SCS.

The second SCS manager 1040 may transmit, to the UE, one or more second downlink transmissions via the set of frequency resources according to the second SCS based on transmitting the signaling that indicates the configuration.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
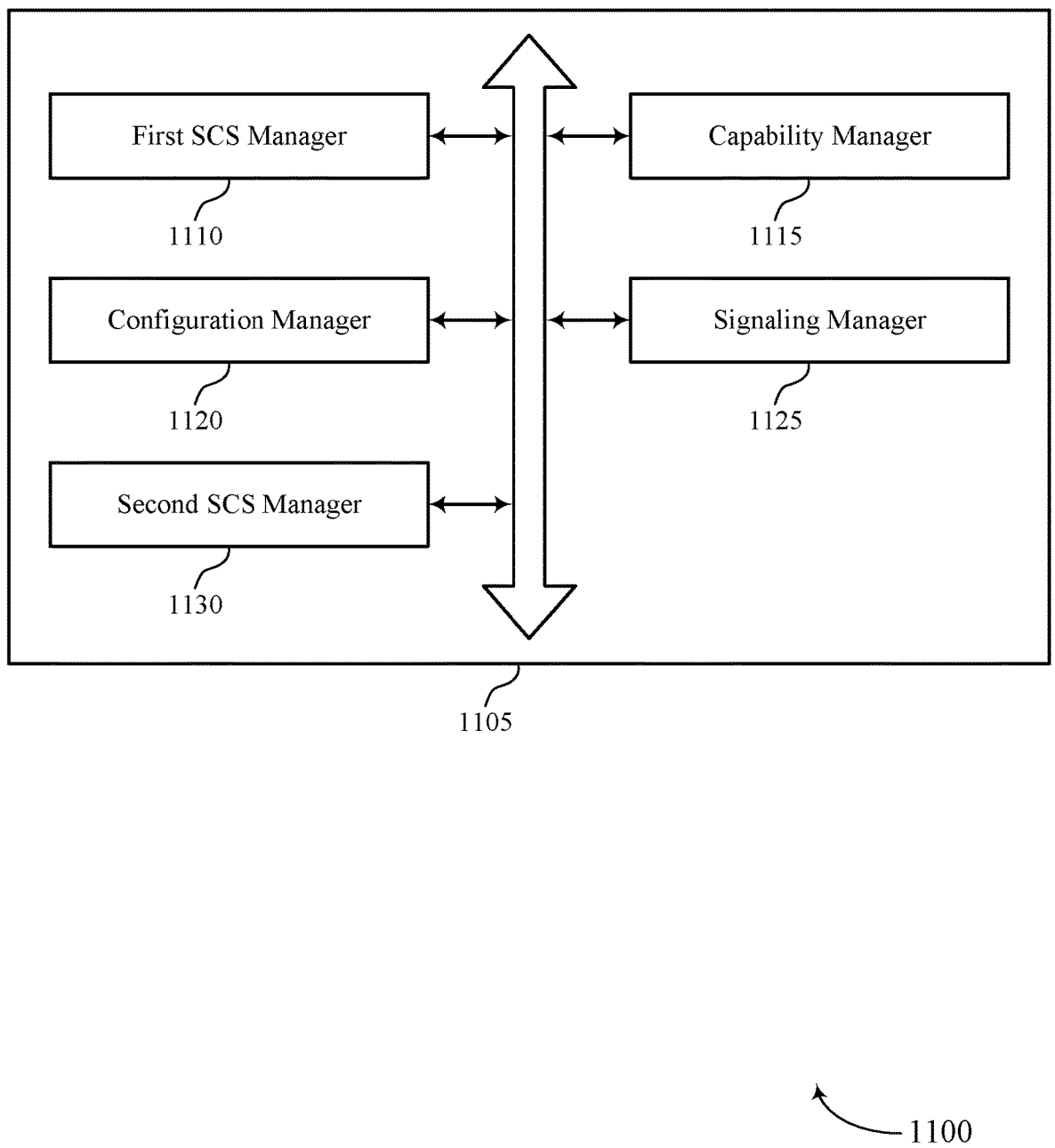
FIG. 11 shows a block diagram of a communications manager that supports reduced SCS windows in accordance with one or more aspects of the present disclosure.

FIG. 11 shows a block diagram 1100 of a communications manager 1105 that supports reduced SCS windows in accordance with one or more aspects of the present disclosure. The communications manager 1105 may be an example of aspects of a communications manager 915, a communications manager 1015, or a communications manager 1210 described herein. The communications manager 1105 may include a first SCS manager 1110, a capability manager 1115, a configuration manager 1120, a signaling manager 1125, and a second SCS manager 1130. Each of these modules may communicate, directly or indirectly, with one another (e.g., via one or more buses).

The first SCS manager 1110 may transmit one or more first downlink transmissions to a UE via a set of frequency resources according to a first SCS. In some cases, the one or more first downlink transmissions include a PDCCH transmission, a PDSCH transmission, or a combination thereof.

The capability manager 1115 may receive, from the UE, an indication of a capability of the UE to switch from the first SCS to a second SCS that is less than the first SCS. In some cases, the indication of the capability of the UE to switch from the first SCS to the second SCS indicates an amount of time for the UE to switch from the first SCS to the second SCS.

The configuration manager 1120 may determine a configuration for the UE to monitor the set of frequency resources according to the second SCS based on the capability of the UE to switch from the first SCS to the second SCS. In some cases, the configuration indicates a duration of time for the UE to monitor the set of frequency resources according to the second SCS. In some instances, the duration of time spans one SSB transmission opportunity within a burst of SSB transmission opportunities. In some examples, the duration of time spans a subset of SSB transmission opportunities within a burst of SSB transmission opportunities. In some cases, the duration of time includes each SSB transmission opportunity within a burst of SSB transmission opportunities.

The signaling manager 1125 may transmit, to the UE in response to receiving the indication of the capability of the UE, signaling that indicates the configuration for monitoring the set of frequency resources according to the second SCS, based on the capability of the UE to switch from the first SCS to the second SCS. In some examples, the signaling manager 1125 may transmit an RRC message to the UE, where transmitting the signaling that indicates the configuration for monitoring the set of frequency resources is based on transmitting the RRC message. In some cases, the signaling manager 1125 may transmit system information to the UE, where transmitting the signaling that indicates the configuration for monitoring the set of frequency resources is based on transmitting the system information. In some instances, the signaling that indicates the configuration for monitoring the set of frequency resources according to the second SCS includes a bitmap. Here, each bit of the bitmap may indicate whether the UE is to monitor the set of frequency resources during a time period associated with an SSB transmission within a burst of SSB transmissions.

In some examples, the signaling manager 1125 may indicate, to the UE based on transmitting the signaling that indicates the configuration, to refrain from the switching from the first SCS to the second SCS until receiving a signal that indicates a switch from the first SCS to the second SCS. Here, the signaling manager 1125 may transmit, to the UE, the signal that indicates the switch, where transmitting one or more second downlink transmissions to the UE is based on transmitting the signal that indicates the switch. In some cases, the signaling manager 1125 may transmit DCI to the UE, where transmitting the signal that indicates the switch is based on transmitting the DCI. In some instances, the signaling manager 1125 may transmit a MAC-CE to the UE, where transmitting the signal that indicates the switch is based on transmitting the MAC-CE. In some examples, the signaling manager 1125 may indicate, to the UE based on transmitting the signaling that indicates the configuration, to autonomously switch from the first SCS to the second SCS, where transmitting the one or more second downlink transmissions to the UE is based on indicating to autonomously switch.

The second SCS manager 1130 may transmit, to the UE, one or more second downlink transmissions via the set of frequency resources according to the second SCS based on transmitting the signaling that indicates the configuration. In some cases, the one or more second downlink transmissions include one or more SSBs.

Figure 12:
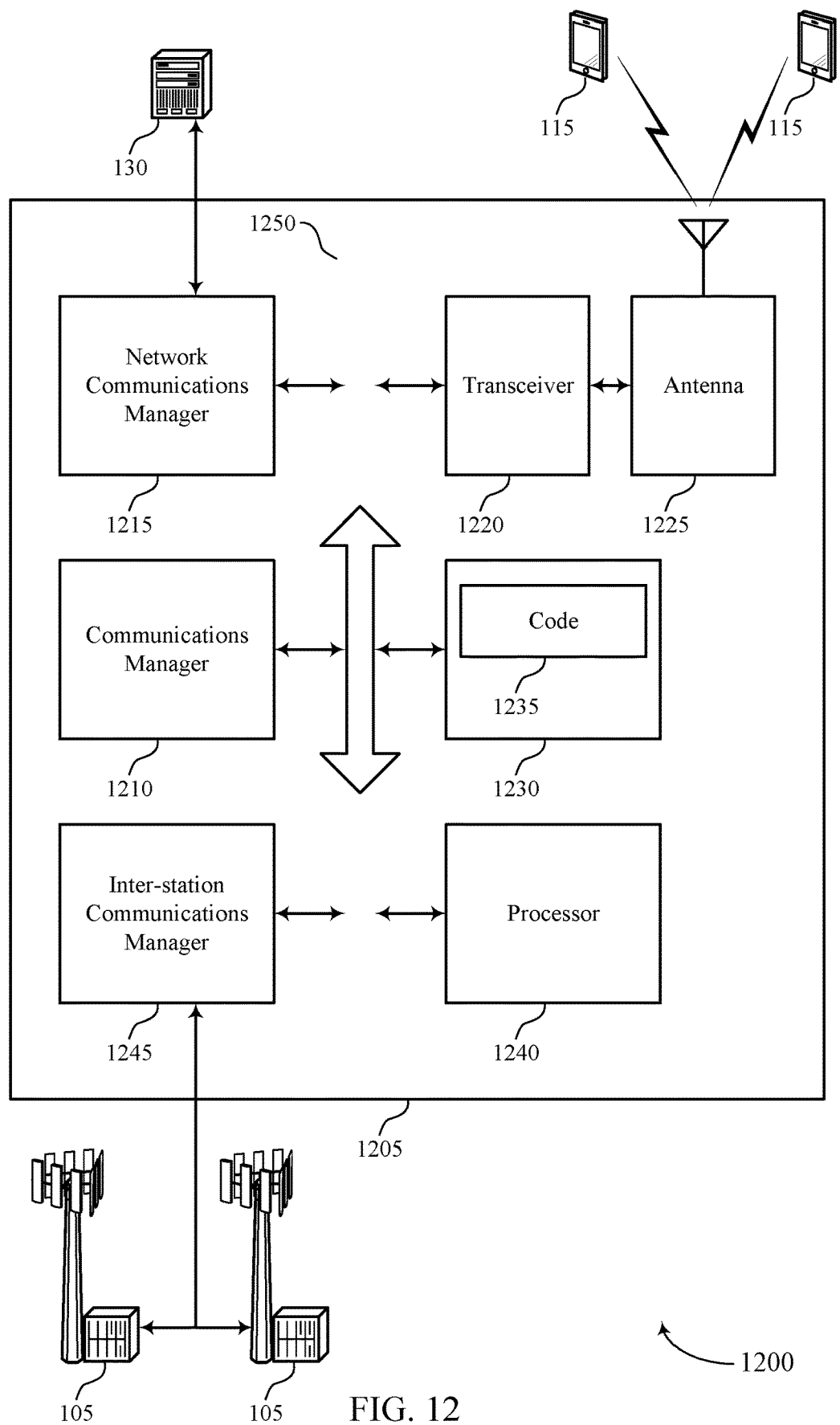
FIG. 12 shows a diagram of a system including a device that supports reduced SCS windows in accordance with one or more aspects of the present disclosure.

FIG. 12 shows a diagram of a system 1200 including a device 1205 that supports reduced SCS windows in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit one or more first downlink transmissions to a UE via a set of frequency resources according to a first SCS, receive, from the UE, an indication of a capability of the UE to switch from the first SCS to a second SCS that is less than the first SCS, and determine a configuration for the UE to monitor the set of frequency resources according to the second SCS based on the capability of the UE to switch from the first SCS to the second SCS. The communications manager 1210 may transmit, to the UE in response to receiving the indication of the capability of the UE, signaling that indicates the configuration for monitoring the set of frequency resources according to the second SCS, and transmit, to the UE, one or more second downlink transmissions via the set of frequency resources according to the second SCS based on transmitting the signaling that indicates the configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reduced SCS window).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

By including or configuring the communications manager 1210 in accordance with examples as described herein, the device 1205 may support techniques for enhanced system signaling allowing for a base station to transmit information to a UE during a reduced SCS window which may increase throughput and enhance the efficiency of wireless communications.

Figure 13:
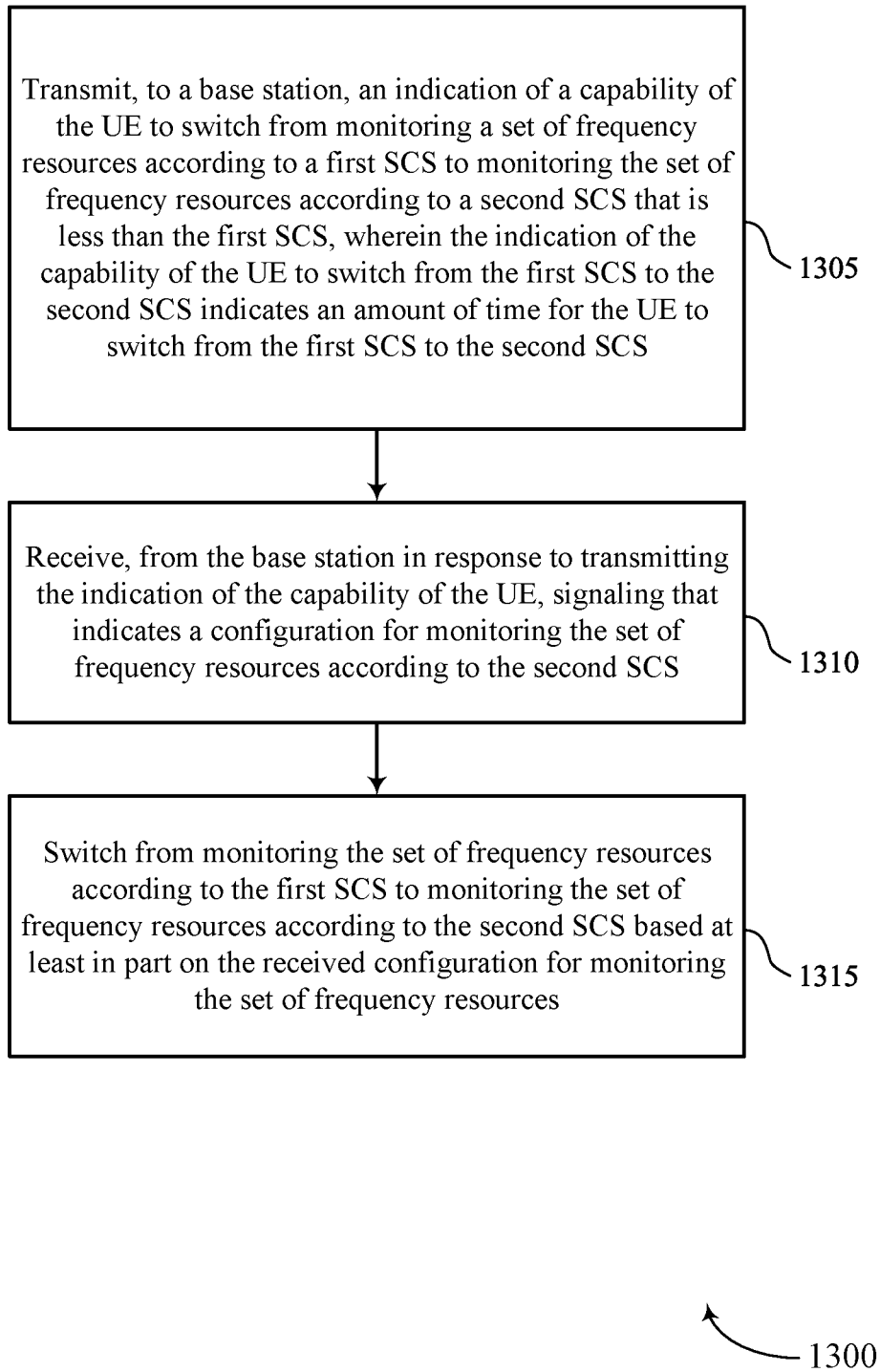
FIGS. 13 through 24 show flowcharts illustrating methods that support reduced SCS window in accordance with one or more aspects of the present disclosure.

FIG. 13 shows a flowchart illustrating a method 1300 that supports reduced SCS window in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The operations of 1305 may be performed in accordance with examples as disclosed herein. In some examples, aspects of the operations of 1305 may be performed by a capability manager 625 as described with reference to FIG. 6.

At 1310, the method may include receiving, from the base station in response to transmitting the indication of the capability of the UE, signaling that indicates a configuration for monitoring the set of frequency resources according to the second SCS. The operations of 1310 may be performed in accordance with examples as disclosed herein. In some examples, aspects of the operations of 1310 may be performed by a configuration manager 630 as described with reference to FIG. 6.

At 1315, the method may include switching from monitoring the set of frequency resources according to the first SCS to monitoring the set of frequency resources according to the second SCS based on the received configuration for monitoring the set of frequency resources. The operations of 1315 may be performed in accordance with examples as disclosed herein. In some examples, aspects of the operations of 1315 may be performed by an SCS switching manager 635 as described with reference to FIG. 6.

Figure 14:
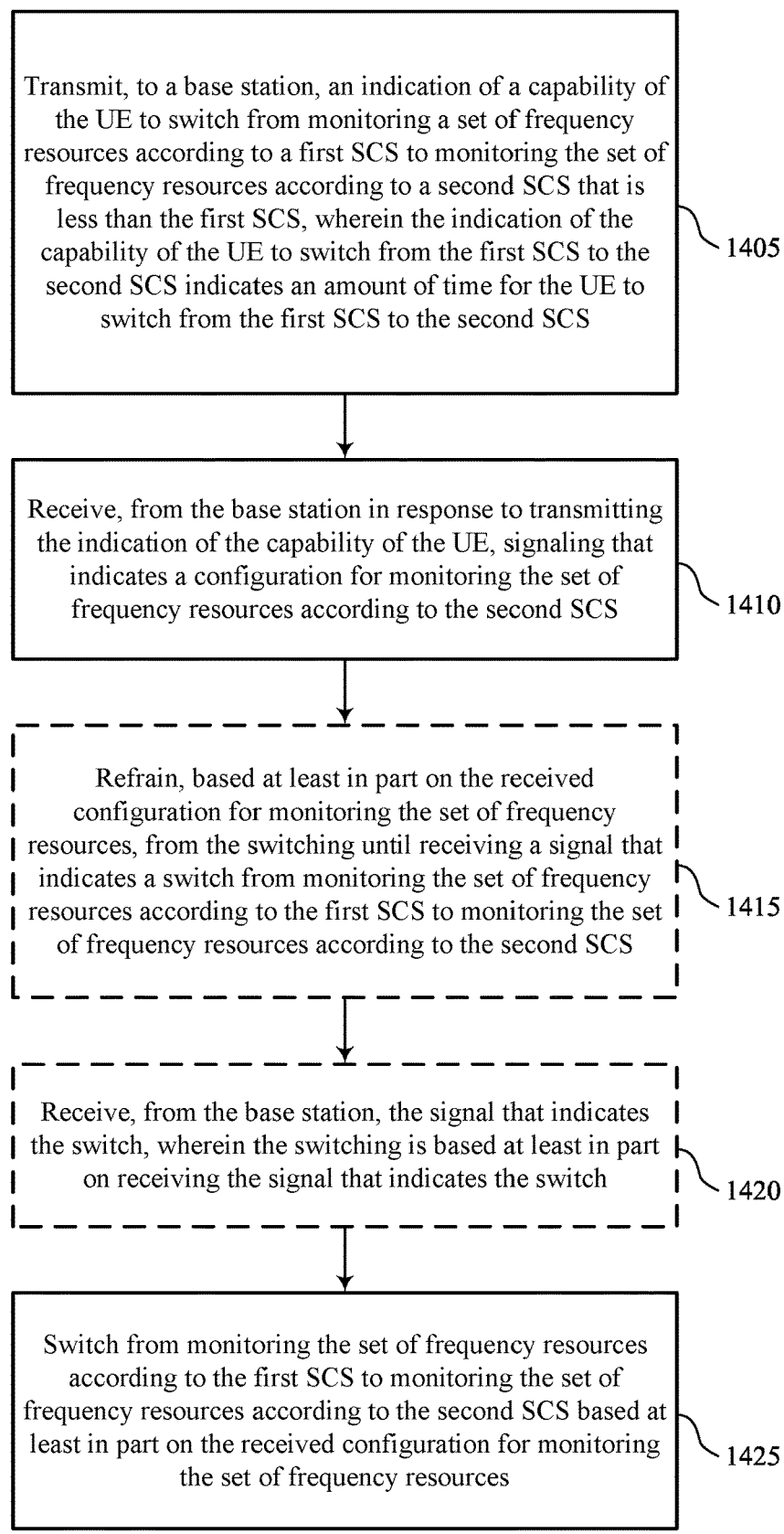

FIG. 14 shows a flowchart illustrating a method 1400 that supports reduced SCS window in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The operations of 1405 may be performed in accordance with examples as disclosed herein. In some examples, aspects of the operations of 1405 may be performed by a capability manager 625 as described with reference to FIG. 6.

At 1410, the method may include receiving, from the base station in response to transmitting the indication of the capability of the UE, signaling that indicates a configuration for monitoring the set of frequency resources according to the second SCS. The operations of 1410 may be performed in accordance with examples as disclosed herein. In some examples, aspects of the operations of 1410 may be performed by a configuration manager 630 as described with reference to FIG. 6.

At 1415, the method may include refraining, based on the received configuration for monitoring the set of frequency resources, from the switching until receiving a signal that indicates a switch from monitoring the set of frequency resources according to the first SCS to monitoring the set of frequency resources according to the second SCS. The operations of 1415 may be performed in accordance with examples as disclosed herein. In some examples, aspects of the operations of 1415 may be performed by an SCS switching manager 635 as described with reference to FIG. 6.

At 1420, the method may include receiving, from the base station, the signal that indicates the switch, where the switching is based on receiving the signal that indicates the switch. The operations of 1420 may be performed in accordance with examples as disclosed herein. In some examples, aspects of the operations of 1420 may be performed by an SCS switching manager 635 as described with reference to FIG. 6.

At 1425, the method may include switching from monitoring the set of frequency resources according to the first SCS to monitoring the set of frequency resources according to the second SCS based on the received configuration for monitoring the set of frequency resources. The operations of 1425 may be performed in accordance with examples as disclosed herein. In some examples, aspects of the operations of 1425 may be performed by an SCS switching manager 635 as described with reference to FIG. 6.

Figure 15:
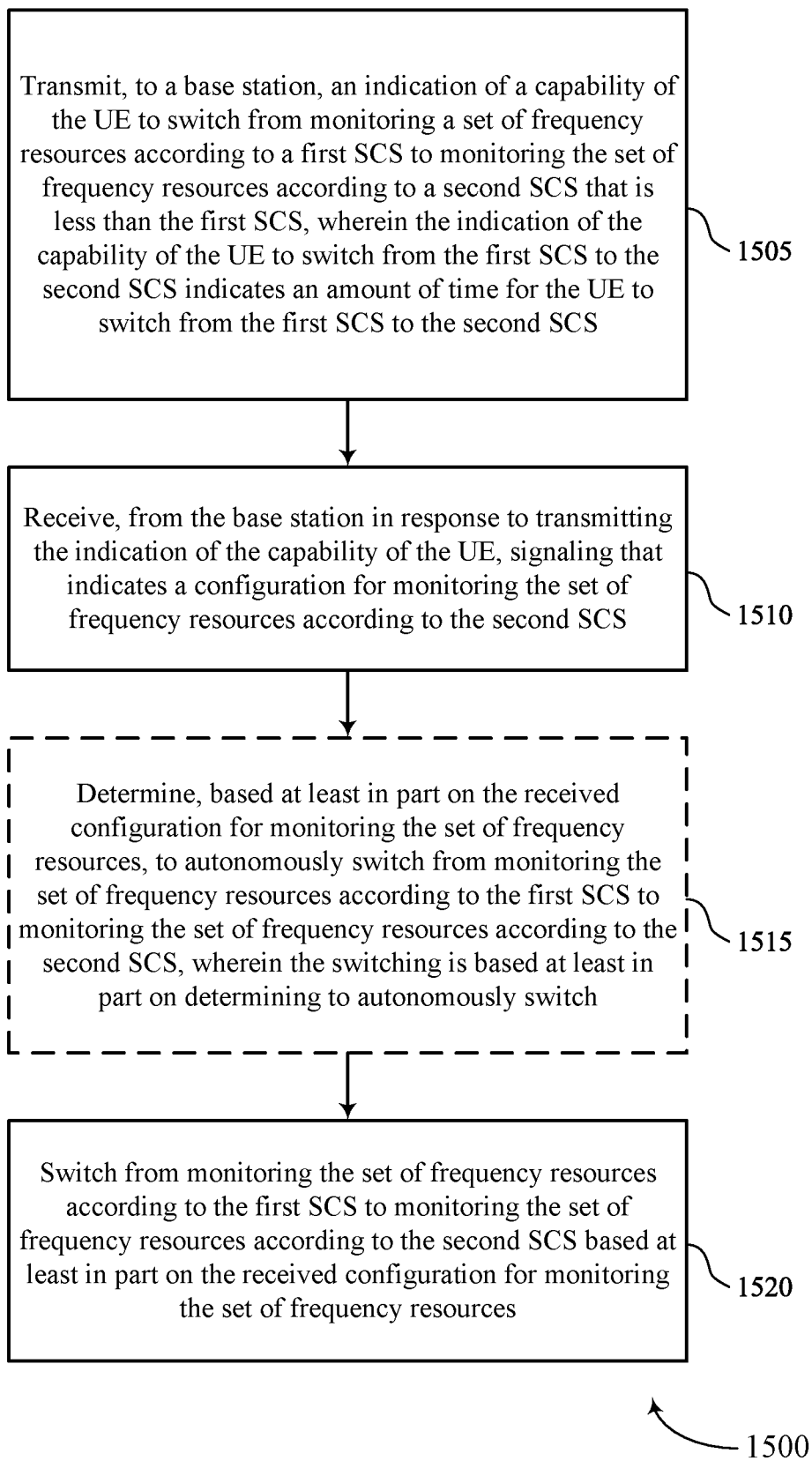

FIG. 15 shows a flowchart illustrating a method 1500 that supports reduced SCS window in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, an indication of a capability of the UE to switch from monitoring a set of frequency resources according to a first SCS to monitoring the set of frequency resources according to a second SCS that is less than the first SCS, where the indication of the capability of the UE to switch from the first SCS to the second SCS indicates an amount of time for the UE to switch from the first SCS to the second SCS. The operations of 1505 may be performed in accordance with examples as disclosed herein. In some examples, aspects of the operations of 1505 may be performed by a capability manager 625 as described with reference to FIG. 6.

At 1510, the method may include receiving, from the base station in response to transmitting the indication of the capability of the UE, signaling that indicates a configuration for monitoring the set of frequency resources according to the second SCS. The operations of 1510 may be performed in accordance with examples as disclosed herein. In some examples, aspects of the operations of 1510 may be performed by a configuration manager 630 as described with reference to FIG. 6.

At 1515, the method may include determining, based on the received configuration for monitoring the set of frequency resources, to autonomously switch from monitoring the set of frequency resources according to the first SCS to monitoring the set of frequency resources according to the second SCS, where the switching is based on determining to autonomously switch. The operations of 1515 may be performed in accordance with examples as disclosed herein. In some examples, aspects of the operations of 1515 may be performed by an SCS switching manager 635 as described with reference to FIG. 6.

At 1520, the method may include switching from monitoring the set of frequency resources according to the first SCS to monitoring the set of frequency resources according to the second SCS based on the received configuration for monitoring the set of frequency resources. The operations of 1520 may be performed in accordance with examples as disclosed herein. In some examples, aspects of the operations of 1520 may be performed by an SCS switching manager 635 as described with reference to FIG. 6.

Figure 16:
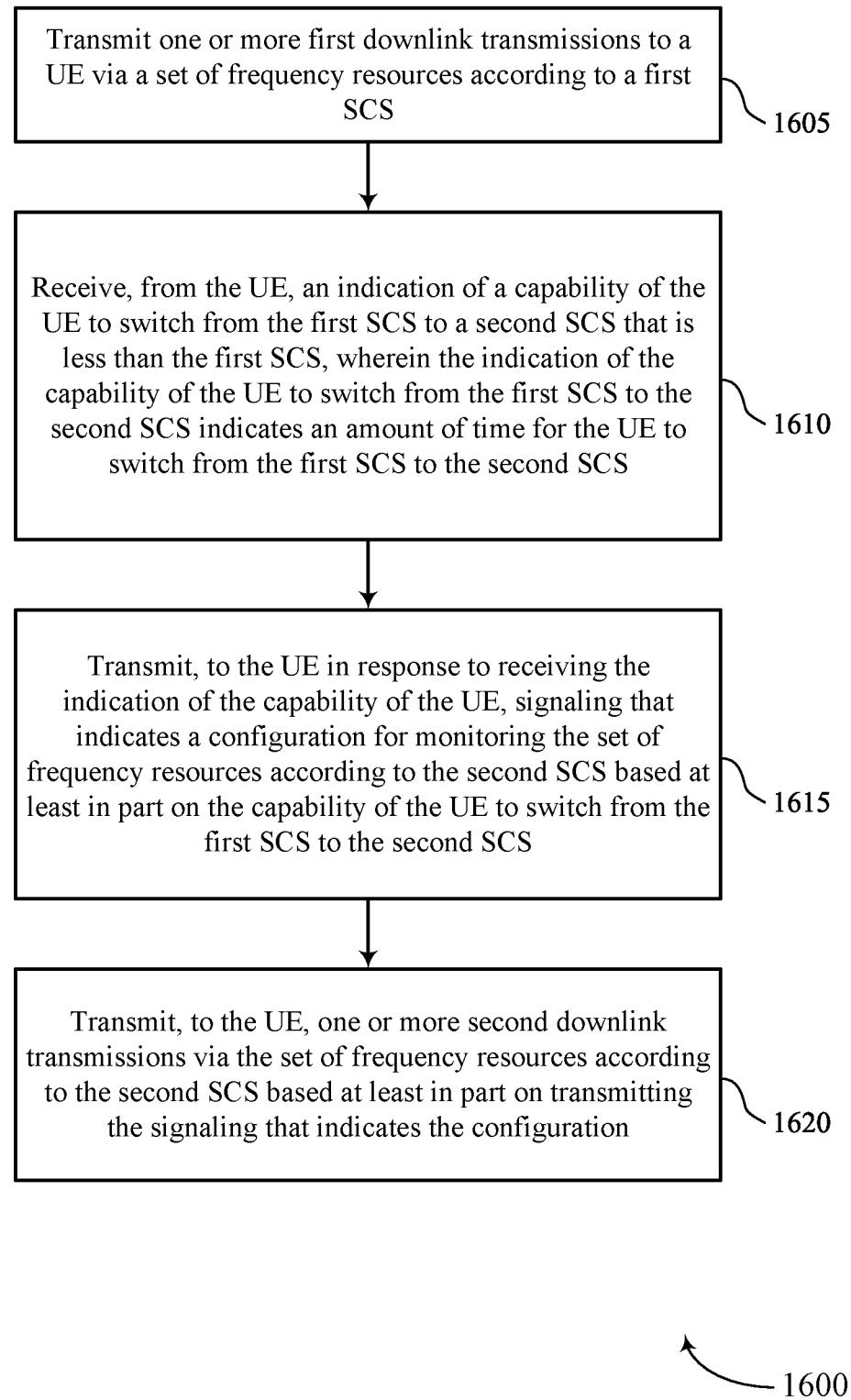

FIG. 16 shows a flowchart illustrating a method 1600 that supports reduced SCS window in accordance with one or more aspects of the present disclosure. The operations of the method 1600 may be implemented by a base station or its components as described herein. For example, the operations of the method 1600 may be performed by a base station 105 as described with reference to FIGS. 1 and 2 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting one or more first downlink transmissions to a UE via a set of frequency resources according to a first SCS. The operations of 1605 may be performed in accordance with examples as disclosed herein. In some examples, aspects of the operations of 1605 may be performed by a first SCS manager 1025 as described with reference to FIG. 10.

At 1610, the method may include receiving, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The operations of 1610 may be performed in accordance with examples as disclosed herein. In some examples, aspects of the operations of 1610 may be performed by a capability manager 1030 as described with reference to FIG. 10.

At 1615, the method may include transmitting, to the UE in response to receiving the indication of the capability of the UE, signaling that indicates a configuration for monitoring the set of frequency resources according to the second SCS based on the capability of the UE to switch from the first SCS to the second SCS. The operations of 1615 may be performed in accordance with examples as disclosed herein. In some examples, aspects of the operations of 1615 may be performed by a signaling manager 1035 as described with reference to FIG. 10.

At 1620, the method may include transmitting, to the UE, one or more second downlink transmissions via the set of frequency resources according to the second SCS based on transmitting the signaling that indicates the configuration. The operations of 1620 may be performed in accordance with examples as disclosed herein. In some examples, aspects of the operations of 1620 may be performed by a second SCS manager 1040 as described with reference to FIG. 10.

Figure 17:
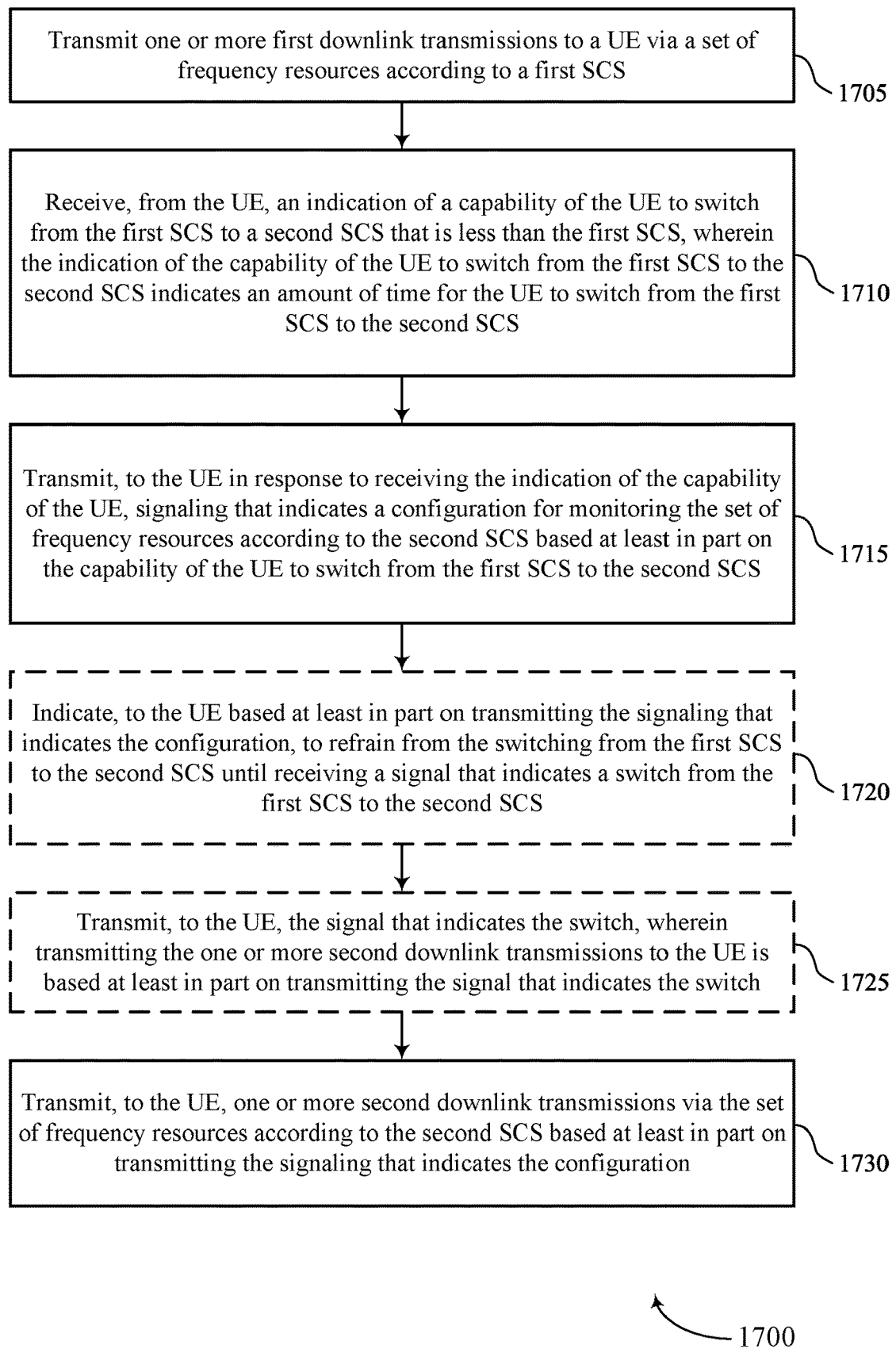

FIG. 17 shows a flowchart illustrating a method 1700 that supports reduced SCS window in accordance with one or more aspects of the present disclosure. The operations of the method 1700 may be implemented by a base station or its components as described herein. For example, the operations of the method 1700 may be performed by a base station 105 as described with reference to FIGS. 1 and 2 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting one or more first downlink transmissions to a UE via a set of frequency resources according to a first SCS. The operations of 1705 may be performed in accordance with examples as disclosed herein. In some examples, aspects of the operations of 1705 may be performed by a first SCS manager 1025 as described with reference to FIG. 10.

At 1710, the method may include receiving, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The operations of 1710 may be performed in accordance with examples as disclosed herein. In some examples, aspects of the operations of 1710 may be performed by a capability manager 1030 as described with reference to FIG. 10.

At 1715, the method may include transmitting, to the UE in response to receiving the indication of the capability of the UE, signaling that indicates a configuration for monitoring the set of frequency resources according to the second SCS based on the capability of the UE to switch from the first SCS to the second SCS. The operations of 1715 may be performed in accordance with examples as disclosed herein. In some examples, aspects of the operations of 1715 may be performed by a signaling manager 1035 as described with reference to FIG. 10.

At 1720, the method may include indicating, to the UE based on transmitting the signaling that indicates the configuration, to refrain from the switching from the first SCS to the second SCS until receiving a signal that indicates a switch from the first SCS to the second SCS. The operations of 1720 may be performed in accordance with examples as disclosed herein. In some examples, aspects of the operations of 1720 may be performed by a signaling manager 1035 as described with reference to FIG. 10.

At 1725, the method may include transmitting, to the UE, the signal that indicates the switch, where transmitting the one or more second downlink transmissions to the UE is based on transmitting the signal that indicates the switch. The operations of 1725 may be performed in accordance with examples as disclosed herein. In some examples, aspects of the operations of 1725 may be performed by a signaling manager 1035 as described with reference to FIG. 10.

At 1730, the method may include transmitting, to the UE, one or more second downlink transmissions via the set of frequency resources according to the second SCS based on transmitting the signaling that indicates the configuration. The operations of 1730 may be performed in accordance with examples as disclosed herein. In some examples, aspects of the operations of 1730 may be performed by a second SCS manager 1040 as described with reference to FIG. 10.

Figure 18:
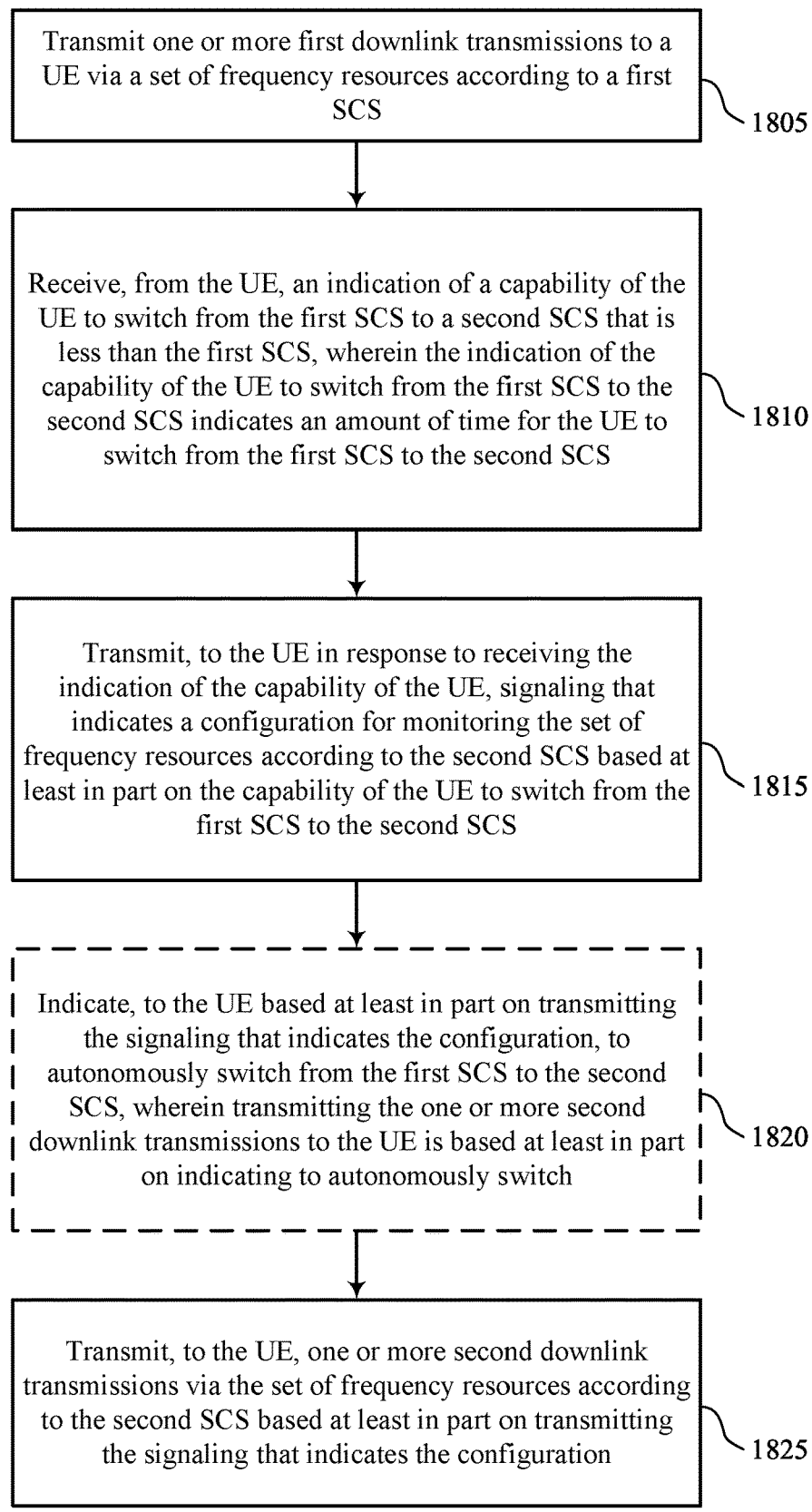

FIG. 18 shows a flowchart illustrating a method 1800 that supports reduced SCS window in accordance with one or more aspects of the present disclosure. The operations of the method 1800 may be implemented by a base station or its components as described herein. For example, the operations of the method 1800 may be performed by a base station 105 as described with reference to FIGS. 1 and 2 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting one or more first downlink transmissions to a UE via a set of frequency resources according to a first SCS. The operations of 1805 may be performed in accordance with examples as disclosed herein. In some examples, aspects of the operations of 1805 may be performed by a first SCS manager 1025 as described with reference to FIG. 10.

At 1810, the method may include receiving, from the UE, an indication of a capability of the UE to switch from the first SCS to a second SCS that is less than the first SCS, where the indication of the capability of the UE to switch from the first SCS to the second SCS indicates an amount of time for the UE to switch from the first SCS to the second SCS. The operations of 1810 may be performed in accordance with examples as disclosed herein. In some examples, aspects of the operations of 1810 may be performed by a capability manager 1030 as described with reference to FIG. 10.

At 1815, the method may include transmitting, to the UE in response to receiving the indication of the capability of the UE, signaling that indicates a configuration for monitoring the set of frequency resources according to the second SCS based on the capability of the UE to switch from the first SCS to the second SCS. The operations of 1815 may be performed in accordance with examples as disclosed herein. In some examples, aspects of the operations of 1815 may be performed by a signaling manager 1035 as described with reference to FIG. 10.

At 1820, the method may include indicating, to the UE based on transmitting the signaling that indicates the configuration, to autonomously switch from the first SCS to the second SCS, where transmitting the one or more second downlink transmissions to the UE is based on indicating to autonomously switch. The operations of 1820 may be performed in accordance with examples as disclosed herein. In some examples, aspects of the operations of 1820 may be performed by a signaling manager 1035 as described with reference to FIG. 10.

At 1825, the method may include transmitting, to the UE, one or more second downlink transmissions via the set of frequency resources according to the second SCS based on transmitting the signaling that indicates the configuration. The operations of 1825 may be performed in accordance with examples as disclosed herein. In some examples, aspects of the operations of 1825 may be performed by a second SCS manager 1040 as described with reference to FIG. 10.

Figure 19:
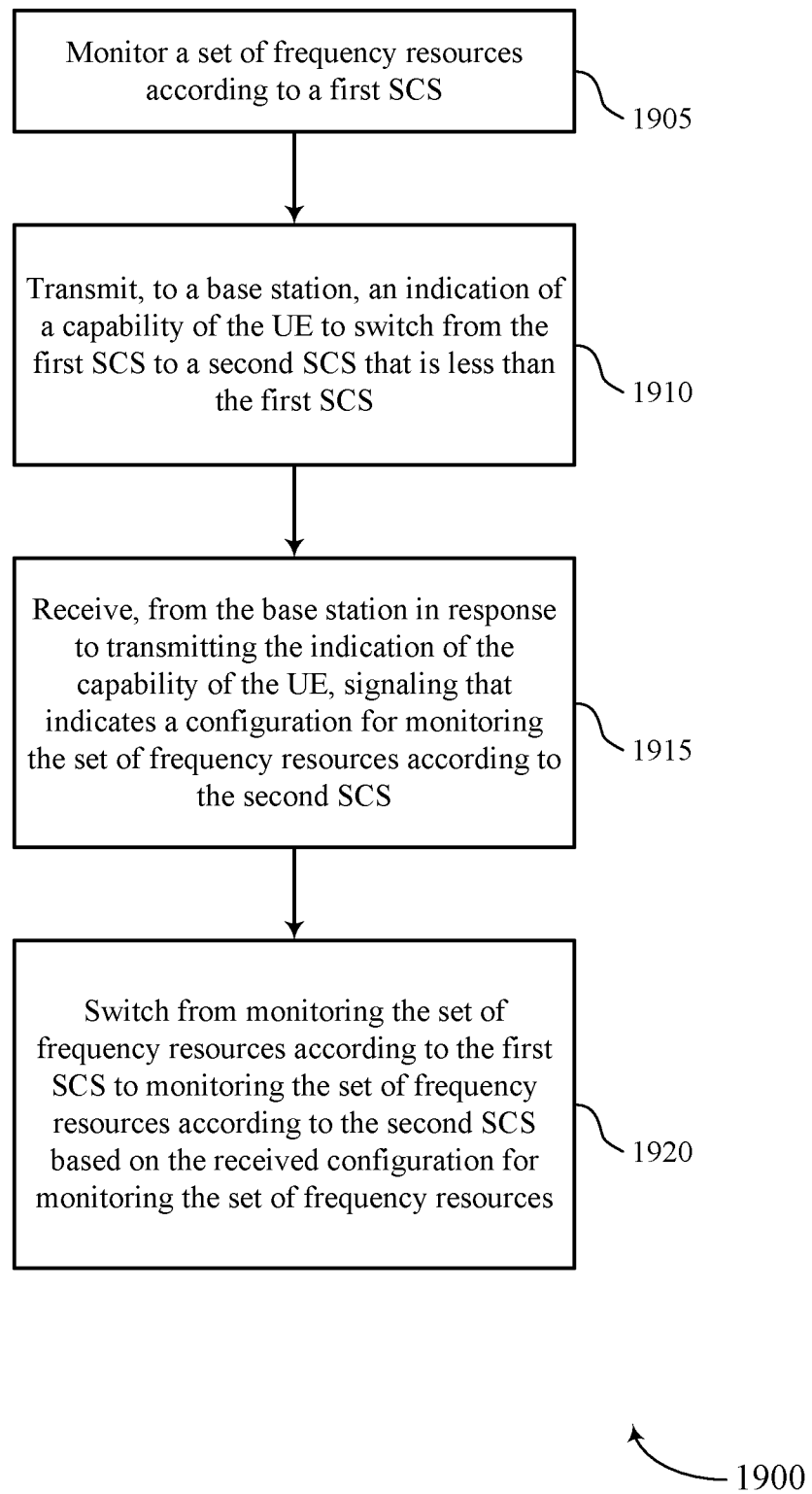

FIG. 19 shows a flowchart illustrating a method 1900 that supports reduced SCS windows in accordance with one or more aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may monitor a set of frequency resources according to a first SCS. The operations of 1905 may be performed according to the methods described herein. In some examples, aspects of the operations of 1905 may be performed by a first SCS manager as described with reference to FIGS. 5 through 8.

At 1910, the UE may transmit, to a base station, an indication of a capability of the UE to switch from the first SCS to a second SCS that is less than the first SCS. The operations of 1910 may be performed according to the methods described herein. In some examples, aspects of the operations of 1910 may be performed by a capability manager as described with reference to FIGS. 5 through 8.

At 1915, the UE may receive, from the base station in response to transmitting the indication of the capability of the UE, signaling that indicates a configuration for monitoring the set of frequency resources according to the second SCS. The operations of 1915 may be performed according to the methods described herein. In some examples, aspects of the operations of 1915 may be performed by a configuration manager as described with reference to FIGS. 5 through 8.

At 1920, the UE may switch from monitoring the set of frequency resources according to the first SCS to monitoring the set of frequency resources according to the second SCS based on the received configuration for monitoring the set of frequency resources. The operations of 1920 may be performed according to the methods described herein. In some examples, aspects of the operations of 1920 may be performed by an SCS switching manager as described with reference to FIGS. 5 through 8.

Figure 20:
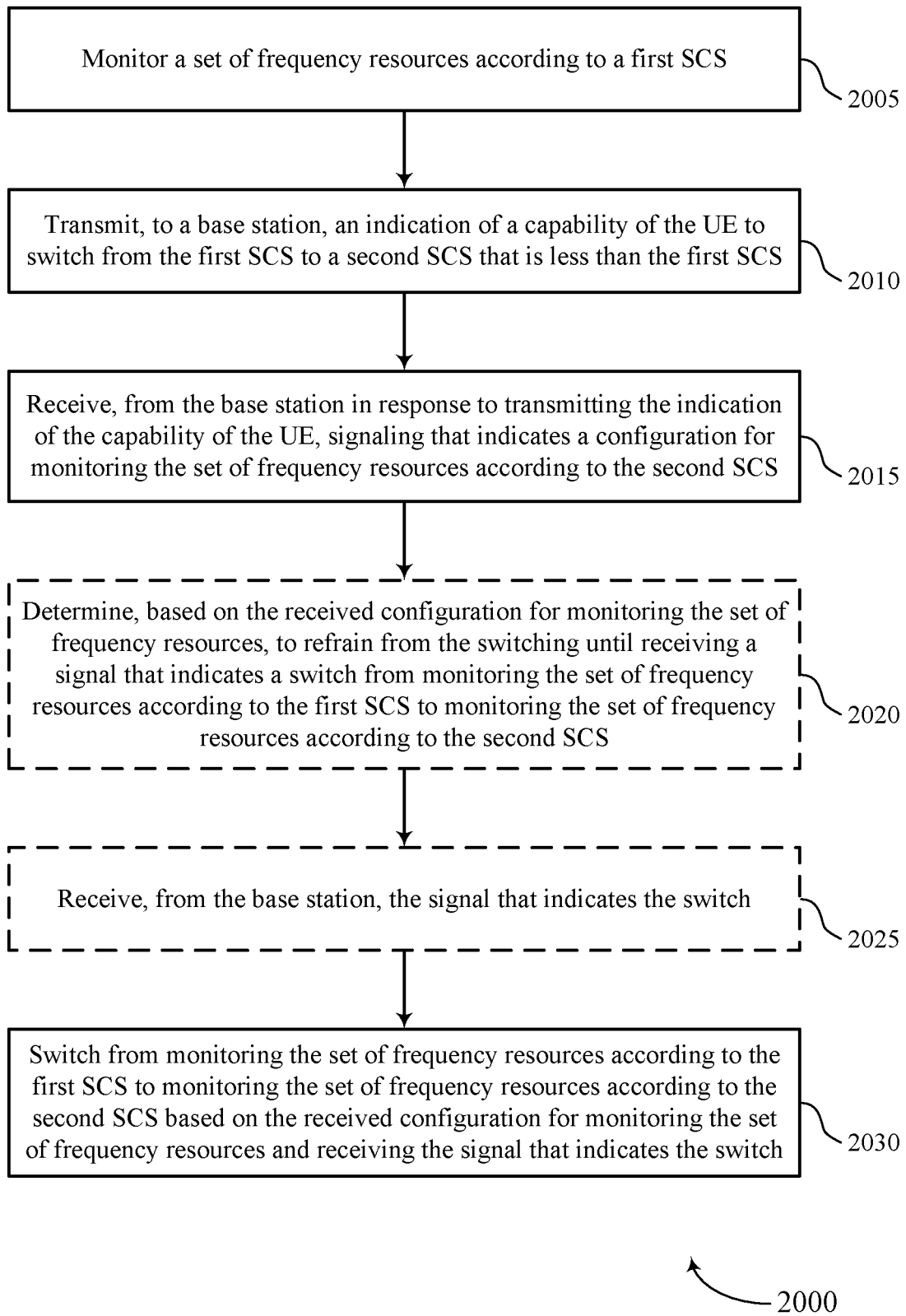

FIG. 20 shows a flowchart illustrating a method 2000 that supports reduced SCS windows in accordance with one or more aspects of the present disclosure. The operations of method 2000 may be implemented by a UE 115 or its components as described herein. For example, the operations of method 2000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2005, the UE may monitor a set of frequency resources according to a first SCS. The operations of 2005 may be performed according to the methods described herein. In some examples, aspects of the operations of 2005 may be performed by a first SCS manager as described with reference to FIGS. 5 through 8.

At 2010, the UE may transmit, to a base station, an indication of a capability of the UE to switch from the first SCS to a second SCS that is less than the first SCS. The operations of 2010 may be performed according to the methods described herein. In some examples, aspects of the operations of 2010 may be performed by a capability manager as described with reference to FIGS. 5 through 8.

At 2015, the UE may receive, from the base station in response to transmitting the indication of the capability of the UE, signaling that indicates a configuration for monitoring the set of frequency resources according to the second SCS. The operations of 2015 may be performed according to the methods described herein. In some examples, aspects of the operations of 2015 may be performed by a configuration manager as described with reference to FIGS. 5 through 8.

At 2020, the UE may determine, based on the received configuration for monitoring the set of frequency resources, to refrain from the switching until receiving a signal that indicates a switch from monitoring the set of frequency resources according to the first SCS to monitoring the set of frequency resources according to the second SCS. The operations of 2020 may be performed according to the methods described herein. In some examples, aspects of the operations of 2020 may be performed by an SCS switching manager as described with reference to FIGS. 5 through 8.

At 2025, the UE may receive, from the base station, the signal that indicates the switch. The operations of 2025 may be performed according to the methods described herein. In some examples, aspects of the operations of 2025 may be performed by an SCS switching manager as described with reference to FIGS. 5 through 8.

At 2030, the UE may switch from monitoring the set of frequency resources according to the first SCS to monitoring the set of frequency resources according to the second SCS based on the received configuration for monitoring the set of frequency resources and receiving the signal that indicates the switch. The operations of 2030 may be performed according to the methods described herein. In some examples, aspects of the operations of 2030 may be performed by an SCS switching manager as described with reference to FIGS. 5 through 8.

Figure 21:
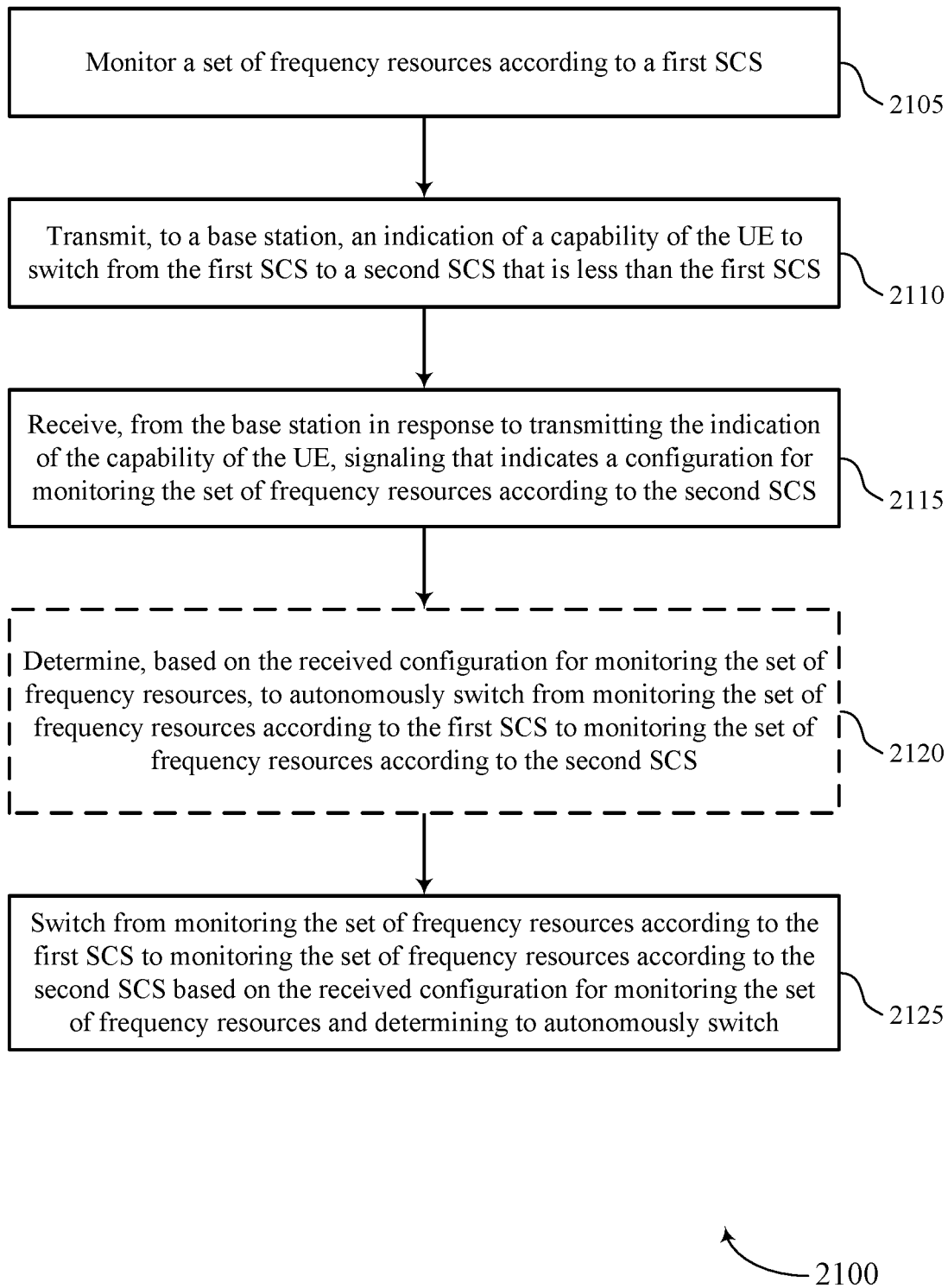

FIG. 21 shows a flowchart illustrating a method 2100 that supports reduced SCS windows in accordance with one or more aspects of the present disclosure. The operations of method 2100 may be implemented by a UE 115 or its components as described herein. For example, the operations of method 2100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2105, the UE may monitor a set of frequency resources according to a first SCS. The operations of 2105 may be performed according to the methods described herein. In some examples, aspects of the operations of 2105 may be performed by a first SCS manager as described with reference to FIGS. 5 through 8.

At 2110, the UE may transmit, to a base station, an indication of a capability of the UE to switch from the first SCS to a second SCS that is less than the first SCS. The operations of 2110 may be performed according to the methods described herein. In some examples, aspects of the operations of 2110 may be performed by a capability manager as described with reference to FIGS. 5 through 8.

At 2115, the UE may receive, from the base station in response to transmitting the indication of the capability of the UE, signaling that indicates a configuration for monitoring the set of frequency resources according to the second SCS. The operations of 2115 may be performed according to the methods described herein. In some examples, aspects of the operations of 2115 may be performed by a configuration manager as described with reference to FIGS. 5 through 8.

At 2120, the UE may determine, based on the received configuration for monitoring the set of frequency resources, to autonomously switch from monitoring the set of frequency resources according to the first SCS to monitoring the set of frequency resources according to the second SCS. The operations of 2120 may be performed according to the methods described herein. In some examples, aspects of the operations of 2120 may be performed by an SCS switching manager as described with reference to FIGS. 5 through 8.

At 2125, the UE may switch from monitoring the set of frequency resources according to the first SCS to monitoring the set of frequency resources according to the second SCS based on the received configuration for monitoring the set of frequency resources and determining to autonomously switch. The operations of 2125 may be performed according to the methods described herein. In some examples, aspects of the operations of 2125 may be performed by an SCS switching manager as described with reference to FIGS. 5 through 8.

Figure 22:
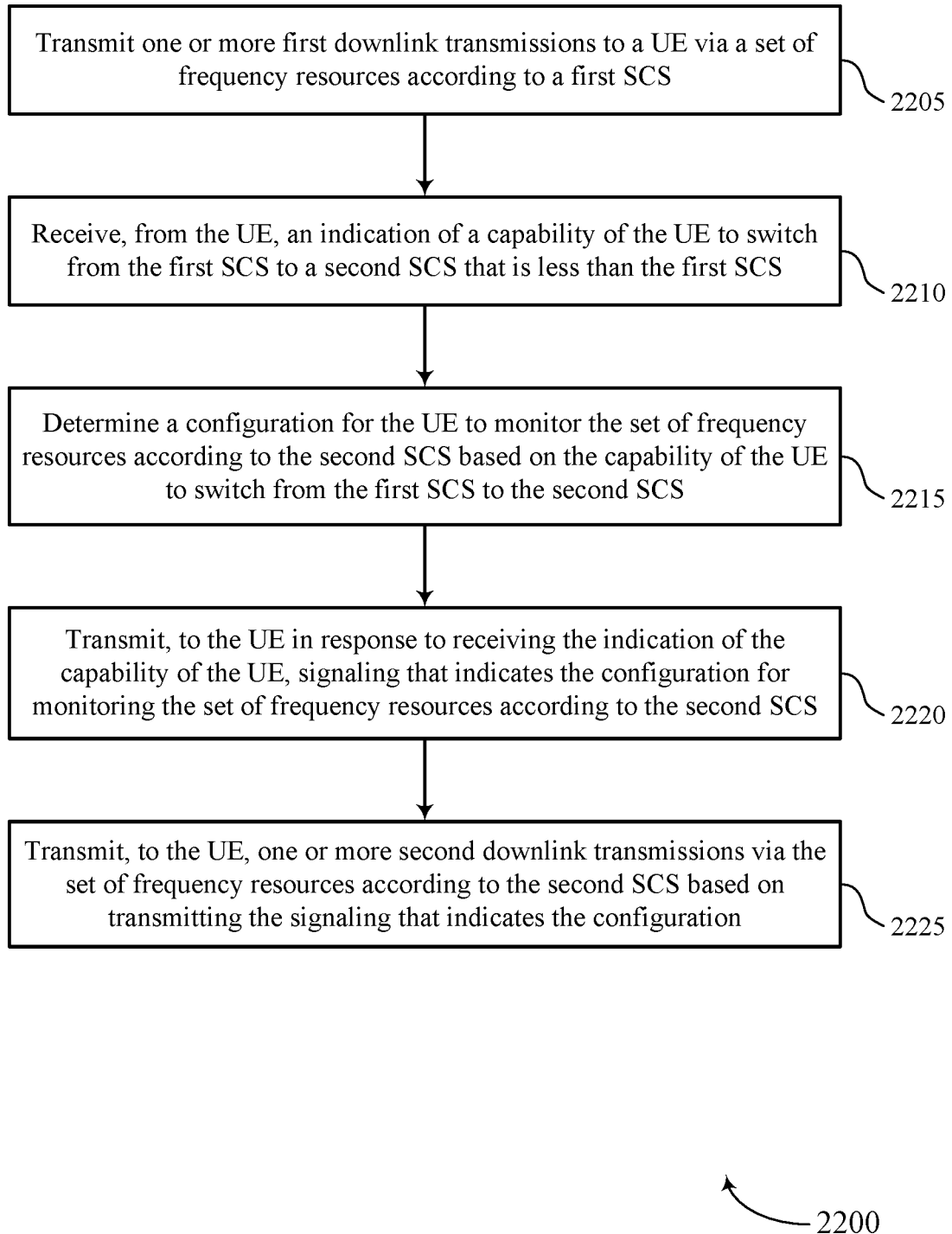

FIG. 22 shows a flowchart illustrating a method 2200 that supports reduced SCS windows in accordance with one or more aspects of the present disclosure. The operations of method 2200 may be implemented by a base station 105 or its components as described herein. For example, the operations of method 2200 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2205, the base station may transmit one or more first downlink transmissions to a UE via a set of frequency resources according to a first SCS. The operations of 2205 may be performed according to the methods described herein. In some examples, aspects of the operations of 2205 may be performed by a first SCS manager as described with reference to FIGS. 9 through 12.

At 2210, the base station may receive, from the UE, an indication of a capability of the UE to switch from the first SCS to a second SCS that is less than the first SCS. The operations of 2210 may be performed according to the methods described herein. In some examples, aspects of the operations of 2210 may be performed by a capability manager as described with reference to FIGS. 9 through 12.

At 2215, the base station may determine a configuration for the UE to monitor the set of frequency resources according to the second SCS based on the capability of the UE to switch from the first SCS to the second SCS. The operations of 2215 may be performed according to the methods described herein. In some examples, aspects of the operations of 2215 may be performed by a configuration manager as described with reference to FIGS. 9 through 12.

At 2220, the base station may transmit, to the UE in response to receiving the indication of the capability of the UE, signaling that indicates the configuration for monitoring the set of frequency resources according to the second SCS. The operations of 2220 may be performed according to the methods described herein. In some examples, aspects of the operations of 2220 may be performed by a signaling manager as described with reference to FIGS. 9 through 12.

At 2225, the base station may transmit, to the UE, one or more second downlink transmissions via the set of frequency resources according to the second SCS based on transmitting the signaling that indicates the configuration. The operations of 2225 may be performed according to the methods described herein. In some examples, aspects of the operations of 2225 may be performed by a second SCS manager as described with reference to FIGS. 9 through 12.

Figure 23:
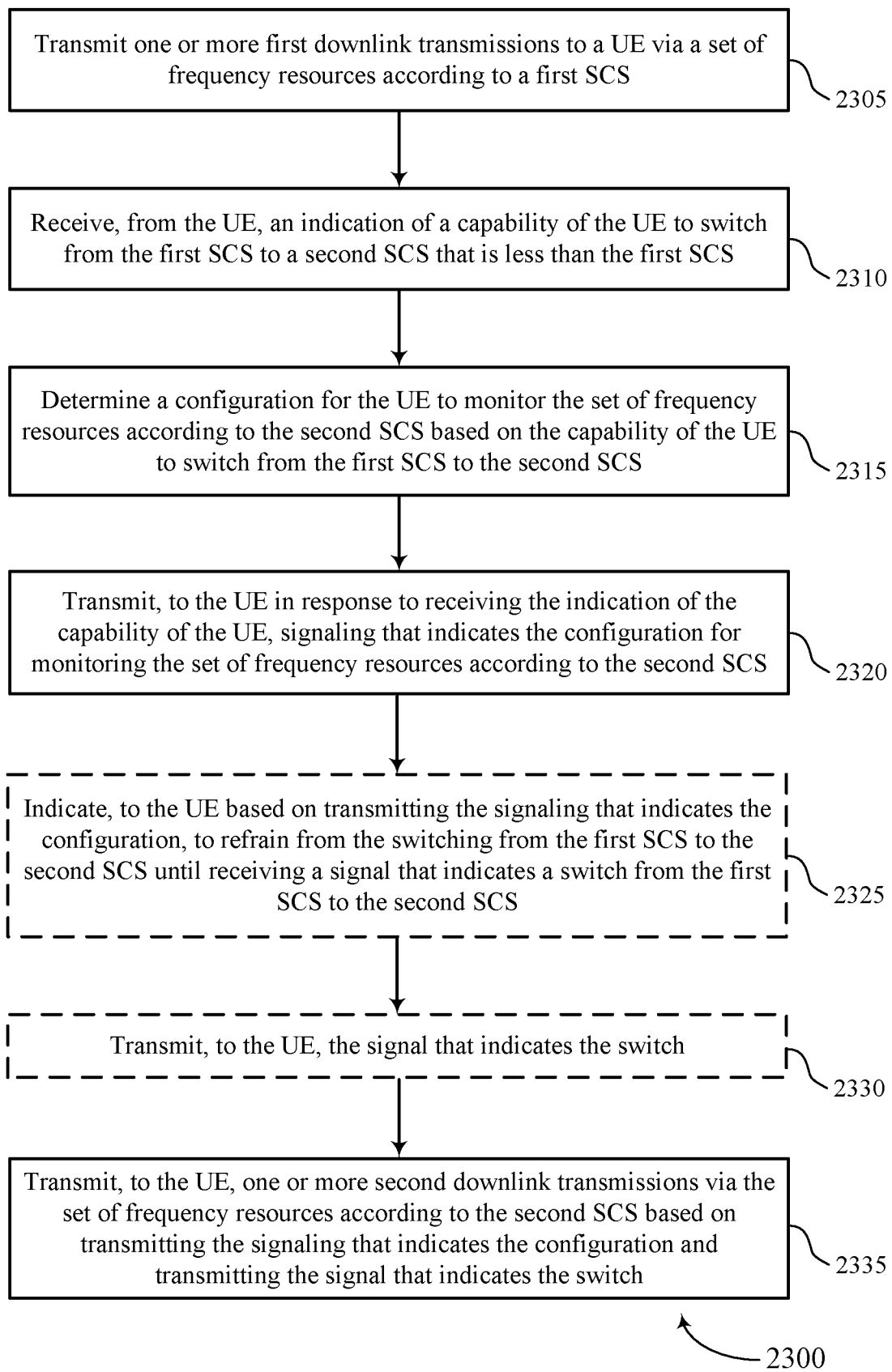

FIG. 23 shows a flowchart illustrating a method 2300 that supports reduced SCS windows in accordance with one or more aspects of the present disclosure. The operations of method 2300 may be implemented by a base station 105 or its components as described herein. For example, the operations of method 2300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2305, the base station may transmit one or more first downlink transmissions to a UE via a set of frequency resources according to a first SCS. The operations of 2305 may be performed according to the methods described herein. In some examples, aspects of the operations of 2305 may be performed by a first SCS manager as described with reference to FIGS. 9 through 12.

At 2310, the base station may receive, from the UE, an indication of a capability of the UE to switch from the first SCS to a second SCS that is less than the first SCS. The operations of 2310 may be performed according to the methods described herein. In some examples, aspects of the operations of 2310 may be performed by a capability manager as described with reference to FIGS. 9 through 12.

At 2315, the base station may determine a configuration for the UE to monitor the set of frequency resources according to the second SCS based on the capability of the UE to switch from the first SCS to the second SCS. The operations of 2315 may be performed according to the methods described herein. In some examples, aspects of the operations of 2315 may be performed by a configuration manager as described with reference to FIGS. 9 through 12.

At 2320, the base station may transmit, to the UE in response to receiving the indication of the capability of the UE, signaling that indicates the configuration for monitoring the set of frequency resources according to the second SCS. The operations of 2330 may be performed according to the methods described herein. In some examples, aspects of the operations of 2330 may be performed by a signaling manager as described with reference to FIGS. 9 through 12.

At 2325, the base station may indicate, to the UE based on transmitting the signaling that indicates the configuration, to refrain from the switching from the first SCS to the second SCS until receiving a signal that indicates a switch from the first SCS to the second SCS. The operations of 2320 may be performed according to the methods described herein. In some examples, aspects of the operations of 2320 may be performed by a signaling manager as described with reference to FIGS. 9 through 12.

At 2330, the base station may transmit, to the UE, the signal that indicates the switch. The operations of 2325 may be performed according to the methods described herein. In some examples, aspects of the operations of 2325 may be performed by a signaling manager as described with reference to FIGS. 9 through 12.

At 2335, the base station may transmit, to the UE, one or more second downlink transmissions via the set of frequency resources according to the second SCS based on transmitting the signaling that indicates the configuration and transmitting the signal that indicates the switch. The operations of 2335 may be performed according to the methods described herein. In some examples, aspects of the operations of 2335 may be performed by a second SCS manager as described with reference to FIGS. 9 through 12.

Figure 24:
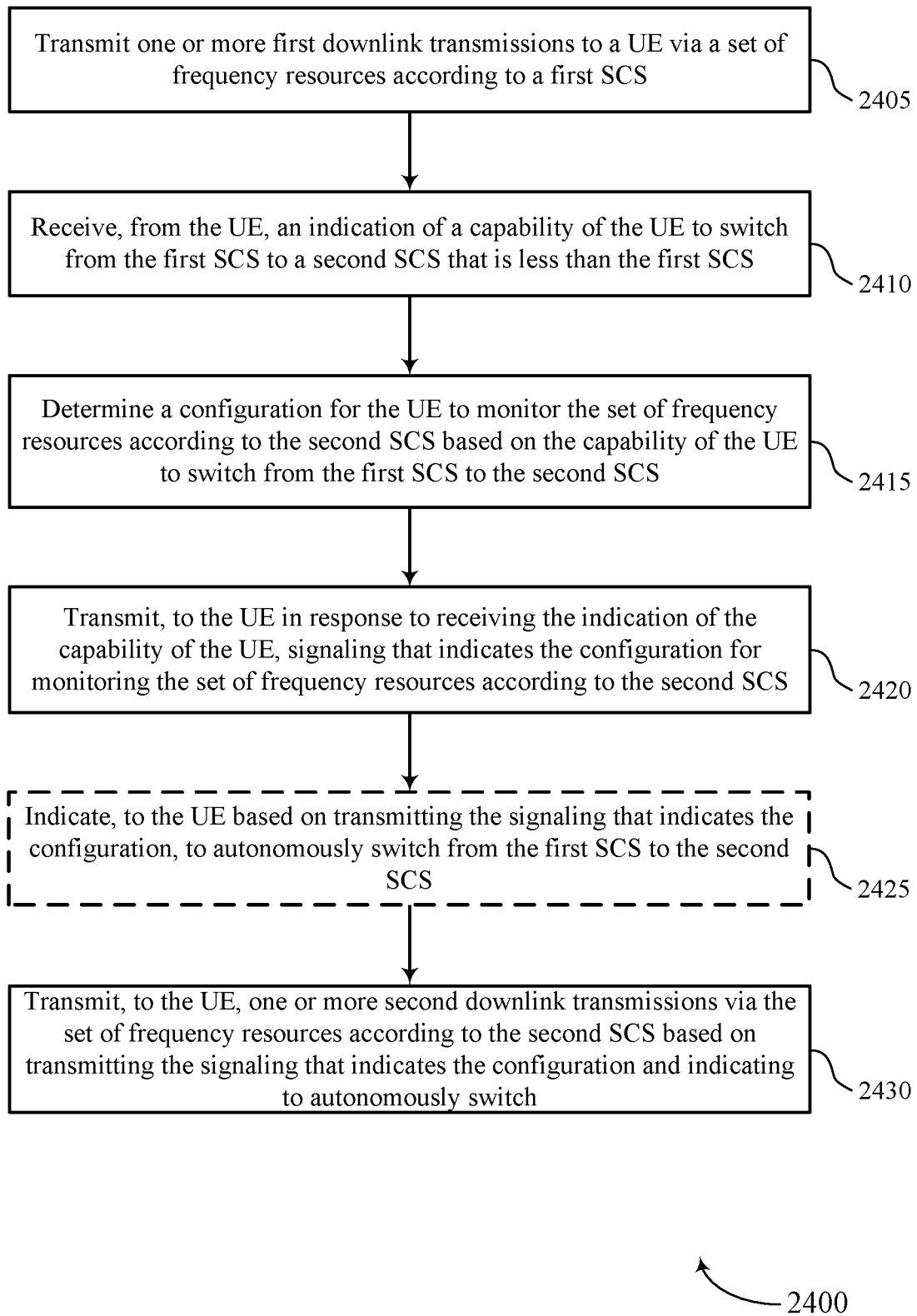

FIG. 24 shows a flowchart illustrating a method 2400 that supports reduced SCS windows in accordance with one or more aspects of the present disclosure. The operations of method 2400 may be implemented by a base station 105 or its components as described herein. For example, the operations of method 2400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2405, the base station may transmit one or more first downlink transmissions to a UE via a set of frequency resources according to a first SCS. The operations of 2405 may be performed according to the methods described herein. In some examples, aspects of the operations of 2405 may be performed by a first SCS manager as described with reference to FIGS. 9 through 12.

At 2410, the base station may receive, from the UE, an indication of a capability of the UE to switch from the first SCS to a second SCS that is less than the first SCS. The operations of 2410 may be performed according to the methods described herein. In some examples, aspects of the operations of 2410 may be performed by a capability manager as described with reference to FIGS. 9 through 12.

At 2415, the base station may determine a configuration for the UE to monitor the set of frequency resources according to the second SCS based on the capability of the UE to switch from the first SCS to the second SCS. The operations of 2415 may be performed according to the methods described herein. In some examples, aspects of the operations of 2415 may be performed by a configuration manager as described with reference to FIGS. 9 through 12.

At 2420, the base station may transmit, to the UE in response to receiving the indication of the capability of the UE, signaling that indicates the configuration for monitoring the set of frequency resources according to the second SCS. The operations of 2425 may be performed according to the methods described herein. In some examples, aspects of the operations of 2425 may be performed by a signaling manager as described with reference to FIGS. 9 through 12.

At 2425, the base station may indicate, to the UE based on transmitting the signaling that indicates the configuration, to autonomously switch from the first SCS to the second SCS. The operations of 2420 may be performed according to the methods described herein. In some examples, aspects of the operations of 2420 may be performed by a signaling manager as described with reference to FIGS. 9 through 12.

At 2430, the base station may transmit, to the UE, one or more second downlink transmissions via the set of frequency resources according to the second SCS based on transmitting the signaling that indicates the configuration and indicating to autonomously switch. The operations of 2430 may be performed according to the methods described herein. In some examples, aspects of the operations of 2430 may be performed by a second SCS manager as described with reference to FIGS. 9 through 12.

The following provides an overview of aspects of the present disclosure:

Aspect 1: A method for wireless communication at a UE, comprising: transmitting, to a base station, an indication of a capability of the UE to switch from monitoring a set of frequency resources according to a first SCS to monitoring the set of frequency resources according to a second SCS that is less than the first SCS, wherein the indication of the capability of the UE to switch from the first SCS to the second SCS indicates an amount of time for the UE to switch from the first SCS to the second SCS; receiving, from the base station in response to transmitting the indication of the capability of the UE, signaling that indicates a configuration for monitoring the set of frequency resources according to the second SCS; and switching from monitoring the set of frequency resources according to the first SCS to monitoring the set of frequency resources according to the second SCS based at least in part on the received configuration for monitoring the set of frequency resources.

Aspect 2: The method of aspect 1, further comprising: refraining, based at least in part on the received configuration for monitoring the set of frequency resources, from the switching until receiving a signal that indicates a switch from monitoring the set of frequency resources according to the first SCS to monitoring the set of frequency resources according to the second SCS; and receiving, from the base station, the signal that indicates the switch, wherein the switching is based at least in part on receiving the signal that indicates the switch.

Aspect 3: The method of aspect 2, further comprising: receiving DCI from the base station, wherein receiving the signal that indicates the switch is based at least in part on receiving the DCI.

Aspect 4: The method of any of aspects 2 through 3, further comprising: receiving a MAC-CE from the base station, wherein receiving the signal that indicates the switch is based at least in part on receiving the MAC-CE.

Aspect 5: The method of any of aspects 1 through 4, further comprising: determining, based at least in part on the received configuration for monitoring the set of frequency resources, to autonomously switch from monitoring the set of frequency resources according to the first SCS to monitoring the set of frequency resources according to the second SCS, wherein the switching is based at least in part on determining to autonomously switch.

Aspect 6: The method of any of aspects 1 through 5, further comprising: monitoring, based at least in part on the switching, the set of frequency resources according to the second SCS for a duration of time indicated by the received configuration for monitoring the set of frequency resources; and switching, after the duration of time, from monitoring the set of frequency resources according to the second SCS to monitoring the set of frequency resources according to the first SCS based at least in part on the received configuration for monitoring the set of frequency resources.

Aspect 7: The method of aspect 6, wherein the duration of time spans one SSB transmission opportunity within a burst of SSB transmission opportunities.

Aspect 8: The method of any of aspects 6 through 7, wherein the duration of time spans a subset of SSB transmission opportunities within a burst of SSB transmission opportunities.

Aspect 9: The method of any of aspects 6 through 8, wherein the duration of time comprises each SSB transmission opportunity within a burst of SSB transmission opportunities.

Aspect 10: The method of any of aspects 1 through 9, wherein the signaling that indicates the configuration for monitoring the set of frequency resources according to the second SCS comprises a bitmap; and each bit of the bitmap indicates whether the UE is to monitor the set of frequency resources during a time period associated with an SSB transmission within a burst of SSB transmissions.

Aspect 11: The method of any of aspects 1 through 10, further comprising: receiving an RRC message from the base station, wherein receiving the signaling that indicates the configuration for monitoring the set of frequency resources is based at least in part on receiving the RRC message.

Aspect 12: The method of any of aspects 1 through 11, further comprising: receiving system information from the base station, wherein receiving the signaling that indicates the configuration for monitoring the set of frequency resources is based at least in part on receiving the system information.

Aspect 13: The method of any of aspects 1 through 12, wherein monitoring the set of frequency resources according to the first SCS further comprises: monitoring the set of frequency resources according to the first SCS for a PDCCH transmission, a PDSCH transmission, or a combination thereof.

Aspect 14: A method for wireless communication at a base station, comprising: transmitting one or more first downlink transmissions to a UE via a set of frequency resources according to a first SCS; receiving, from the UE, an indication of a capability of the UE to switch from the first SCS to a second SCS that is less than the first SCS, wherein the indication of the capability of the UE to switch from the first SCS to the second SCS indicates an amount of time for the UE to switch from the first SCS to the second SCS; transmitting, to the UE in response to receiving the indication of the capability of the UE, signaling that indicates a configuration for monitoring the set of frequency resources according to the second SCS based at least in part on the capability of the UE to switch from the first SCS to the second SCS; and transmitting, to the UE, one or more second downlink transmissions via the set of frequency resources according to the second SCS based at least in part on transmitting the signaling that indicates the configuration.

Aspect 15: The method of aspect 14, further comprising: indicating, to the UE based at least in part on transmitting the signaling that indicates the configuration, to refrain from the switching from the first SCS to the second SCS until receiving a signal that indicates a switch from the first SCS to the second SCS; and transmitting, to the UE, the signal that indicates the switch, wherein transmitting the one or more second downlink transmissions to the UE is based at least in part on transmitting the signal that indicates the switch.

Aspect 16: The method of aspect 15, further comprising: transmitting DCI to the UE, wherein transmitting the signal that indicates the switch is based at least in part on transmitting the DCI.

Aspect 17: The method of any of aspects 15 through 16, further comprising: transmitting a MAC-CE to the UE, wherein transmitting the signal that indicates the switch is based at least in part on transmitting the MAC-CE.

Aspect 18: The method of any of aspects 14 through 17, further comprising: indicating, to the UE based at least in part on transmitting the signaling that indicates the configuration, to autonomously switch from the first SCS to the second SCS, wherein transmitting the one or more second downlink transmissions to the UE is based at least in part on indicating to autonomously switch.

Aspect 19: The method of any of aspects 14 through 18, wherein the configuration indicates a duration of time for the UE to monitor the set of frequency resources according to the second SCS.

Aspect 20: The method of aspect 19, wherein the duration of time spans one SSB transmission opportunity within a burst of SSB transmission opportunities.

Aspect 21: The method of any of aspects 19 through 20, wherein the duration of time spans a subset of SSB transmission opportunities within a burst of SSB transmission opportunities.

Aspect 22: The method of any of aspects 19 through 21, wherein the duration of time comprises each SSB transmission opportunity within a burst of SSB transmission opportunities.

Aspect 23: The method of any of aspects 14 through 22, wherein the signaling that indicates the configuration for monitoring the set of frequency resources according to the second SCS comprises a bitmap; and each bit of the bitmap indicates whether the UE is to monitor the set of frequency resources during a time period associated with an SSB transmission within a burst of SSB transmissions.

Aspect 24: The method of any of aspects 14 through 23, further comprising: transmitting an RRC message to the UE, wherein transmitting the signaling that indicates the configuration for monitoring the set of frequency resources is based at least in part on transmitting the RRC message.

Aspect 25: The method of any of aspects 14 through 24, further comprising: transmitting system information to the UE, wherein transmitting the signaling that indicates the configuration for monitoring the set of frequency resources is based at least in part on transmitting the system information.

Aspect 26: The method of any of aspects 14 through 25, wherein the one or more second downlink transmissions comprise one or more SSBs.

Aspect 27: The method of any of aspects 14 through 26, wherein the one or more first downlink transmissions comprise a PDCCH transmission, a PDSCH transmission, or a combination thereof.

Aspect 28: An apparatus for wireless communication at a UE, comprising a processor; and memory coupled to the processor, the processor and memory configured to perform a method of any of aspects 1 through 13.

Aspect 29: An apparatus for wireless communication at a UE, comprising at least one means for performing a method of any of aspects 1 through 13.

Aspect 30: A non-transitory computer-readable medium storing code for wireless communication at a UE, the code comprising instructions executable by a processor to perform a method of any of aspects 1 through 13.

Aspect 31: An apparatus for wireless communication at a base station, comprising a processor; and memory coupled to the processor, the processor and memory configured to perform a method of any of aspects 14 through 27.

Aspect 32: An apparatus for wireless communication at a base station, comprising at least one means for performing a method of any of aspects 14 through 27.

Aspect 33: A non-transitory computer-readable medium storing code for wireless communication at a base station, the code comprising instructions executable by a processor to perform a method of any of aspects 14 through 27.

Aspect 34: A method for wireless communication at a UE, comprising: monitoring a set of frequency resources according to a first SCS; transmitting, to a base station, an indication of a capability of the UE to switch from the first SCS to a second SCS that is less than the first SCS; receiving, from the base station in response to transmitting the indication of the capability of the UE, signaling that indicates a configuration for monitoring the set of frequency resources according to the second SCS; and switching from monitoring the set of frequency resources according to the first SCS to monitoring the set of frequency resources according to the second SCS based at least in part on the received configuration for monitoring the set of frequency resources.

Aspect 35: The method of aspect 34, further comprising: determining, based at least in part on the received configuration for monitoring the set of frequency resources, to refrain from the switching until receiving a signal that indicates a switch from monitoring the set of frequency resources according to the first SCS to monitoring the set of frequency resources according to the second SCS; and receiving, from the base station, the signal that indicates the switch, wherein the switching is based at least in part on receiving the signal that indicates the switch.

Aspect 36: The method of aspects 34 and 35, further comprising: receiving DCI from the base station, wherein receiving the signal that indicates the switch is based at least in part on receiving the DCI.

Aspect 37: The method of aspects 34 and 35, further comprising: receiving a MAC-CE from the base station, wherein receiving the signal that indicates the switch is based at least in part on receiving the MAC-CE.

Aspect 38: The method of aspects 34 through 37, further comprising: determining, based at least in part on the received configuration for monitoring the set of frequency resources, to autonomously switch from monitoring the set of frequency resources according to the first SCS to monitoring the set of frequency resources according to the second SCS, wherein the switching is based at least in part on determining to autonomously switch.

Aspect 39: The method of aspects 34 through 38, further comprising: monitoring, based at least in part on the switching, the set of frequency resources according to the second SCS for a duration of time indicated by the received configuration for monitoring the set of frequency resources; and switching, after the duration of time, from monitoring the set of frequency resources according to the second SCS to monitoring the set of frequency resources according to the first SCS based at least in part on the received configuration for monitoring the set of frequency resources.

Aspect 40: The method of aspects 34 through 39, wherein the duration of time spans one SSB transmission opportunity within a burst of SSB transmission opportunities.

Aspect 41: The method of aspects 34 through 39, wherein the duration of time spans a subset of SSB transmission opportunities within a burst of SSB transmission opportunities.

Aspect 42: The method of aspects 34 through 39, wherein the duration of time comprises each SSB transmission opportunity within a burst of SSB transmission opportunities.

Aspect 43: The method of aspects 34 through 42, wherein: the signaling that indicates the configuration for monitoring the set of frequency resources according to the second SCS comprises a bitmap; and each bit of the bitmap indicates whether the UE is to monitor the set of frequency resources during a time period associated with an SSB transmission within a burst of SSB transmissions.

Aspect 44: The method of aspects 34 through 43, further comprising: receiving an RRC message from the base station, wherein receiving the signaling that indicates the configuration for monitoring the set of frequency resources is based at least in part on receiving the RRC message.

Aspect 45: The method of aspects 34 through 43, further comprising: receiving system information from the base station, wherein receiving the signaling that indicates the configuration for monitoring the set of frequency resources is based at least in part on receiving the system information.

Aspect 46: The method of aspects 34 through 45, wherein the indication of the capability of the UE to switch from the first SCS to the second SCS indicates an amount of time for the UE to switch from the first SCS to the second SCS.

Aspect 47: The method of aspects 34 through 46, wherein monitoring the set of frequency resources according to the first SCS further comprises: monitoring the set of frequency resources according to the first SCS for a PDCCH transmission, a PDSCH transmission, or a combination thereof.

Aspect 48: A method for wireless communication at a base station, comprising: transmitting one or more first downlink transmissions to a UE via a set of frequency resources according to a first SCS; receiving, from the UE, an indication of a capability of the UE to switch from the first SCS to a second SCS that is less than the first SCS; determining a configuration for the UE to monitor the set of frequency resources according to the second SCS based at least in part on the capability of the UE to switch from the first SCS to the second SCS; transmitting, to the UE in response to receiving the indication of the capability of the UE, signaling that indicates the configuration for monitoring the set of frequency resources according to the second SCS; and transmitting, to the UE, one or more second downlink transmissions via the set of frequency resources according to the second SCS based at least in part on transmitting the signaling that indicates the configuration.

Aspect 49: The method of aspect 48, further comprising: indicating, to the UE based at least in part on transmitting the signaling that indicates the configuration, to refrain from the switching from the first SCS to the second SCS until receiving a signal that indicates a switch from the first SCS to the second SCS; and transmitting, to the UE, the signal that indicates the switch, wherein transmitting the one or more second downlink transmissions to the UE is based at least in part on transmitting the signal that indicates the switch.

Aspect 50: The method of aspects 48 and 49, further comprising: transmitting DCI to the UE, wherein transmitting the signal that indicates the switch is based at least in part on transmitting the DCI.

Aspect 51: The method of aspects 48 and 49, further comprising: transmitting a MAC-CE to the UE, wherein transmitting the signal that indicates the switch is based at least in part on transmitting the MAC-CE.

Aspect 52: The method of aspects 48 through 51, further comprising: indicating, to the UE based at least in part on transmitting the signaling that indicates the configuration, to autonomously switch from the first SCS to the second SCS, wherein transmitting the one or more second downlink transmissions to the UE is based at least in part on indicating to autonomously switch.

Aspect 53: The method of aspects 48 through 52, wherein the configuration indicates a duration of time for the UE to monitor the set of frequency resources according to the second SCS.

Aspect 54: The method of aspects 48 through 53, wherein the duration of time spans one SSB transmission opportunity within a burst of SSB transmission opportunities.

Aspect 55: The method of aspects 48 through 53, wherein the duration of time spans a subset of SSB transmission opportunities within a burst of SSB transmission opportunities.

Aspect 56: The method of aspects 48 through 54, wherein the duration of time comprises each SSB transmission opportunity within a burst of SSB transmission opportunities.

Aspect 57: The method of aspects 48 through 56, wherein: the signaling that indicates the configuration for monitoring the set of frequency resources according to the second SCS comprises a bitmap; and each bit of the bitmap indicates whether the UE is to monitor the set of frequency resources during a time period associated with an SSB transmission within a burst of SSB transmissions.

Aspect 58: The method of aspects 48 through 57, further comprising: transmitting an RRC message to the UE, wherein transmitting the signaling that indicates the configuration for monitoring the set of frequency resources is based at least in part on transmitting the RRC message.

Aspect 59: The method of aspects 48 through 57, further comprising: transmitting system information to the UE, wherein transmitting the signaling that indicates the configuration for monitoring the set of frequency resources is based at least in part on transmitting the system information.

Aspect 60: The method of aspects 48 through 59, wherein the indication of the capability of the UE to switch from the first SCS to the second SCS indicates an amount of time for the UE to switch from the first SCS to the second SCS.

Aspect 61: The method of aspects 48 through 60 wherein the one or more second downlink transmissions comprise one or more SSBs.

Aspect 62: The method of aspects 48 through 61, wherein the one or more first downlink transmissions comprise a PDCCH transmission, a PDSCH transmission, or a combination thereof.

Aspect 63: An apparatus for wireless communication at a UE, comprising: a processor; and memory coupled to the processor, the processor and memory configured to perform a method of any one of aspects 34 through 47.

Aspect 64: An apparatus for wireless communication at a base station, comprising: a processor; and memory coupled to the processor, the processor and memory configured to perform a method of any one of aspects 48 through 62.

Aspect 65: An apparatus for wireless communication at a UE, comprising: means for performing any one of aspects 34 through 47.

Aspect 66: An apparatus for wireless communication at a base station, comprising: means for performing any one of aspects 48 through 62.

Aspect 67: A non-transitory computer-readable medium storing code for wireless communication at a UE, the code comprising instructions executable by a processor to perform any one of aspects 34 through 47.

Aspect 68: A non-transitory computer-readable medium storing code for wireless communication at a base station, the code comprising instructions executable by a processor to perform any one of aspects 48 through 62.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    one or more memories; and
    one or more processors coupled with the one or more memories, the one or more processors individually or collectively configured to cause the UE to:
        transmit, to a network entity, an indication of a capability of the UE to switch from a first subcarrier spacing to monitor a first set of frequency resources to a second subcarrier spacing to monitor the first set of frequency resources, the second subcarrier spacing being less than the first subcarrier spacing, the indication of the capability of the UE to switch from the first subcarrier spacing to the second subcarrier spacing comprising an indication of an amount of time for the UE to switch from the first subcarrier spacing to the second subcarrier spacing;
        receive, from the network entity, in response to the transmission of the indication of the capability of the UE, a first signal that indicates a configuration to monitor the first set of frequency resources according to the second subcarrier spacing; and
        switch from the first subcarrier spacing to the second subcarrier spacing to monitor the first set of frequency resources in accordance with the configuration.

2. The apparatus of claim 1, wherein the one or more processors are individually or collectively configured to cause the UE to:
    refrain, based at least in part on the configuration, from the switch until a second signal is received that indicates to switch from the first subcarrier spacing to the second subcarrier spacing; and
    receive, from the network entity, the second signal that indicates to switch from the first subcarrier spacing to the second subcarrier spacing.

3. The apparatus of claim 2, wherein the one or more processors are individually or collectively configured to cause the UE to:
    receive downlink control information from the network entity, wherein the second signal that indicates the switch is received based at least in part on the reception of the downlink control information.

4. The apparatus of claim 2, wherein the one or more processors are individually or collectively configured to cause the UE to:
    receive a media access control-control element (MAC-CE) from the network entity, wherein the second signal that indicates the switch is received based at least in part on the reception of the MAC-CE.

5. The apparatus of claim 1, wherein the one or more processors are individually or collectively configured to cause the UE to:
    determine, from the configuration, to autonomously switch from the first subcarrier spacing to the second subcarrier spacing, wherein the switch is based at least in part on the determination to autonomously switch.

6. The apparatus of claim 1, wherein the one or more processors are individually or collectively configured to cause the UE to:
    monitor, based at least in part on the switch, the first set of frequency resources according to the second subcarrier spacing for a duration of time indicated by the configuration; and
    switch, after the duration of time, from the second subcarrier spacing to the first subcarrier spacing based at least in part on the configuration.

7. The apparatus of claim 6, wherein the duration of time spans one synchronization signal block transmission opportunity within a burst of synchronization signal block transmission opportunities.

8. The apparatus of claim 6, wherein the duration of time spans a subset of synchronization signal block transmission opportunities within a burst of synchronization signal block transmission opportunities.

9. The apparatus of claim 6, wherein the duration of time comprises each synchronization signal block transmission opportunity within a burst of synchronization signal block transmission opportunities.

10. The apparatus of claim 1, wherein:
the first signal that indicates the configuration to monitor the first set of frequency resources according to the second subcarrier spacing comprises a bitmap; and
each bit of the bitmap indicates whether the UE is to monitor the first set of frequency resources during a time period associated with a synchronization signal block transmission within a burst of synchronization signal block transmissions.

11. The apparatus of claim 1, wherein the one or more processors are individually or collectively configured to cause the UE to:
receive a radio resource control message from the network entity, wherein the first signal that indicates the configuration to monitor the first set of frequency resources is received based at least in part on the reception of the radio resource control message.

12. The apparatus of claim 1, wherein the one or more processors are individually or collectively configured to cause the UE to:
receive system information from the network entity, wherein the first signal that indicates the configuration to monitor the first set of frequency resources is received based at least in part on the reception of the system information.

13. The apparatus of claim 1, wherein the one or more processors are individually or collectively configured to cause the UE to:
monitor the first set of frequency resources according to the first subcarrier spacing for a physical downlink control channel transmission, a physical downlink shared channel transmission, or a combination thereof.

14. An apparatus for wireless communication at a network entity, comprising:
one or more memories; and
one or more processors coupled with the one or more memories, the one or more processors individually or collectively configured to cause the network entity to:
output one or more first downlink transmissions via a first set of frequency resources according to a first subcarrier spacing;
obtain, an indication of a capability of a user equipment (UE) to switch from the first subcarrier spacing to a second subcarrier spacing, the second subcarrier spacing being less than the first subcarrier spacing, the indication of the capability of the UE to switch from the first subcarrier spacing to the second subcarrier spacing comprising an indication of an amount of time for the UE to switch from the first subcarrier spacing to the second subcarrier spacing; and
output, in response to the obtained indication of the capability of the UE, signaling that indicates a configuration to monitor the first set of frequency resources according to the second subcarrier spacing based at least in part on the capability of the UE to switch from the first subcarrier spacing to the second subcarrier spacing; and
output one or more second downlink transmissions via the first set of frequency resources according to the second subcarrier spacing based at least in part on the outputted signaling that indicates the configuration.

15. The apparatus of claim 14, wherein the one or more processors are individually or collectively configured to cause the network entity to:
indicate, based at least in part on the outputted signaling that indicates the configuration, to refrain from the switch from the first subcarrier spacing to the second subcarrier spacing; and
output a signal that indicates a switch from the first subcarrier spacing to the second subcarrier spacing, wherein the one or more second downlink transmissions is output based at least in part on the output of the signal that indicates the switch.

16. The apparatus of claim 15, wherein the one or more processors are individually or collectively configured to cause the network entity to:
output downlink control information, wherein the signal that indicates the switch is output based at least in part on the output of the downlink control information.

17. The apparatus of claim 15, wherein the one or more processors are individually or collectively configured to cause the network entity to:
output a media access control-control element (MAC-CE) to the UE, wherein the signal that indicates the switch is output based at least in part on the output of the MAC-CE.

18. The apparatus of claim 14, wherein the one or more processors are individually or collectively configured to cause the network entity to:
indicate, based at least in part on the outputted signaling that indicates the configuration, to autonomously switch from the first subcarrier spacing to the second subcarrier spacing, wherein the one or more second downlink transmissions are output based at least in part on the indication to autonomously switch.

19. The apparatus of claim 14, wherein the configuration indicates a duration of time for the UE to monitor the first set of frequency resources according to the second subcarrier spacing.

20. The apparatus of claim 19, wherein the duration of time spans one synchronization signal block transmission opportunity within a burst of synchronization signal block transmission opportunities.

21. The apparatus of claim 19, wherein the duration of time spans a subset of synchronization signal block transmission opportunities within a burst of synchronization signal block transmission opportunities.

22. The apparatus of claim 19, wherein the duration of time comprises each synchronization signal block transmission opportunity within a burst of synchronization signal block transmission opportunities.

23. The apparatus of claim 14, wherein:
the signaling that indicates the configuration to monitor the first set of frequency resources according to the second subcarrier spacing comprises a bitmap; and
each bit of the bitmap indicates to monitor the first set of frequency resources during a time period associated with a synchronization signal block transmission within a burst of synchronization signal block transmissions.

24. The apparatus of claim 14, wherein the one or more processors are individually or collectively configured to cause the network entity to:
output a radio resource control message, wherein the signaling that indicates the configuration to monitor the first set of frequency resources is outputted based at least in part on the output of the radio resource control message.

25. The apparatus of claim 14, wherein the one or more processors are individually or collectively configured to cause the network entity to:
output system information, wherein the signaling that indicates the configuration to monitor the first set of frequency resources is output based at least in part on the output of the system information.

26. The apparatus of claim 14, wherein:
the one or more second downlink transmissions comprise one or more synchronization signal blocks.

27. The apparatus of claim 14, wherein the one or more first downlink transmissions comprise a physical downlink control channel transmission, a physical downlink shared channel transmission, or a combination thereof.

28. A method for wireless communication at a user equipment (UE), comprising:
transmitting, to a network entity, an indication of a capability of the UE to switch from monitoring a first set of frequency resources according to a first subcarrier spacing to monitoring the first set of frequency resources according to a second subcarrier spacing, the second subcarrier spacing being less than the first subcarrier spacing, the indication of the capability of the UE to switch from the first subcarrier spacing to the second subcarrier spacing indicating an amount of time for the UE to switch from the first subcarrier spacing to the second subcarrier spacing;
receiving, from the network entity in response to transmitting the indication of the capability of the UE, first signaling that indicates a configuration for monitoring the first set of frequency resources according to the second subcarrier spacing; and
switching from monitoring the first set of frequency resources according to the first subcarrier spacing to monitoring the first set of frequency resources according to the second subcarrier spacing based in accordance with the configuration.

29. The method of claim 28, further comprising:
refraining, based at least in part on the configuration for monitoring the first set of frequency resources, from the switching until receiving a second signal that indicates to switch from monitoring the first set of frequency resources according to the first subcarrier spacing to monitoring the first set of frequency resources according to the second subcarrier spacing; and
receiving, from the network entity, the second signal that indicates to switch, wherein the switching is based at least in part on receiving the second signal that indicates the switch.

30. The method of claim 28, further comprising:
determining, based at least in part on the configuration for monitoring the first set of frequency resources, to autonomously switch monitoring the first set of frequency resources according to the first subcarrier spacing to monitoring the first set of frequency resources according to the second subcarrier spacing, wherein the switching is based at least in part on determining to autonomously switch.

31. A method for wireless communication at a network entity, comprising:
outputting one or more first downlink transmissions via a first set of frequency resources according to a first subcarrier spacing;
obtaining, an indication of a capability of a user equipment (UE) to switch from the first subcarrier spacing to a second subcarrier spacing, the second subcarrier spacing being less than the first subcarrier spacing, the indication of the capability of the UE to switch from the first subcarrier spacing to the second subcarrier spacing indicates an amount of time for the UE to switch from the first subcarrier spacing to the second subcarrier spacing;
outputting, in response to obtaining the indication of the capability of the UE, signaling that indicates a configuration for monitoring the first set of frequency resources according to the second subcarrier spacing based at least in part on the capability of the UE to switch from the first subcarrier spacing to the second subcarrier spacing; and
outputting one or more second downlink transmissions via the first set of frequency resources according to the second subcarrier spacing based at least in part on the outputted signaling that indicates the configuration.

32. The method of claim 31, further comprising:
indicating, based at least in part on transmitting the signaling that indicates the configuration, to refrain from the switching from the first subcarrier spacing to the second subcarrier spacing until receiving a signal that indicates a switch from the first subcarrier spacing to the second subcarrier spacing; and
outputting the signal that indicates the switch, wherein outputting the one or more second downlink transmissions is based at least in part on the signal being outputted that indicates the switch.

33. The method of claim 31, further comprising:
indicating, based at least in part on the signaling being outputted that indicates the configuration, to autonomously switch from the first subcarrier spacing to the second subcarrier spacing, wherein outputting the one or more second downlink transmissions is based at least in part on indicating to autonomously switch.

34. The method of claim 31, wherein the configuration indicates a duration of time to monitor the first set of frequency resources according to the second subcarrier spacing.

35. A non-transitory computer-readable medium storing code for wireless communication at a user equipment (UE), the code comprising instructions executable by one or more processors to:
transmit, to a network entity, an indication of a capability of the UE to switch from a first subcarrier spacing to monitor a first set of frequency resources to a second subcarrier spacing to monitor the first set of frequency resources, the second subcarrier spacing being less than the first subcarrier spacing, the indication of the capability of the UE to switch from the first subcarrier spacing to the second subcarrier spacing comprising an indication of an amount of time for the UE to switch from the first subcarrier spacing to the second subcarrier spacing;
receive, from the network entity, in response to the transmission of the indication of the capability of the UE, a first signal that indicates a configuration to monitor the first set of frequency resources according to the second subcarrier spacing; and
switch from the first subcarrier spacing to the second subcarrier spacing to monitor the first set of frequency resources in accordance with the configuration.

36. The non-transitory computer-readable medium of claim 35, wherein the instructions are further executable by the one or more processors to:
refrain, based at least in part on the configuration, from the switch until a second signal is received that indicates to switch from the first subcarrier spacing to the second subcarrier spacing; and receive, from the network entity, the second signal that indicates to switch from the first subcarrier spacing to the second subcarrier spacing.

37. The non-transitory computer-readable medium of claim 35, wherein the instructions are further executable by the one or more processors to:

determine, from the configuration, to autonomously switch from the first subcarrier spacing to the second subcarrier spacing, wherein the switch is based at least in part on the determination to autonomously switch.

38. A non-transitory computer-readable medium storing code for wireless communication at a network entity, the code comprising instructions executable by one or more processors to:

output one or more first downlink transmissions via a first set of frequency resources according to a first subcarrier spacing;

obtain an indication of a capability of a user equipment (UE) to switch from the first subcarrier spacing to a second subcarrier spacing, the second subcarrier spacing being less than the first subcarrier spacing, the indication of the capability of the UE to switch from the first subcarrier spacing to the second subcarrier spacing comprising an indication of an amount of time for the UE to switch from the first subcarrier spacing to the second subcarrier spacing;

output, in response to the obtained indication of the capability of the UE, signaling that indicates a configuration to monitor the first set of frequency resources according to the second subcarrier spacing based at least in part on the capability of the UE to switch from the first subcarrier spacing to the second subcarrier spacing; and output one or more second downlink transmissions via the first set of frequency resources according to the second subcarrier spacing based at least in part on the signaling that is being outputted that indicates the configuration.

39. The non-transitory computer-readable medium of claim 38, wherein the instructions are further executable by the one or more processors to:

indicate, based at least in part on the signaling that is being outputted that indicates the configuration, to refrain from the switch from the first subcarrier spacing to the second subcarrier spacing; and output a signal that indicates a switch from the first subcarrier spacing to the second subcarrier spacing, wherein the one or more second downlink transmissions is output based at least in part on the output of the signal that indicates the switch.

40. The non-transitory computer-readable medium of claim 38, wherein the instructions are further executable by the one or more processors to:

indicate, based at least in part on the signaling that is being outputted that indicates the configuration, to autonomously switch from the first subcarrier spacing to the second subcarrier spacing, wherein the one or more second downlink transmissions are output based at least in part on the indication to autonomously switch.

* * * * *